US008316270B2

(12) United States Patent
Chae et al.

(10) Patent No.: US 8,316,270 B2
(45) Date of Patent: Nov. 20, 2012

(54) APPARATUS AND METHOD FOR SUPPORTING SYNCHRONOUS HYBRID AUTOMATIC REPEAT REQUEST IN BROADBAND WIRELESS COMMUNICATION SYSTEM

(75) Inventors: Seong-Hyeon Chae, Seongnam-si (KR); Hee-Won Kang, Seongnam-si (KR); Young-Bo Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 803 days.

(21) Appl. No.: 12/425,284

(22) Filed: Apr. 16, 2009

(65) Prior Publication Data

US 2009/0265599 A1 Oct. 22, 2009

(30) Foreign Application Priority Data

Apr. 18, 2008 (KR) .................. 10-2008-0036024
Apr. 18, 2008 (KR) .................. 10-2008-0036029

(51) Int. Cl.
*G06F 11/00* (2006.01)
(52) U.S. Cl. ....................... 714/749; 714/748
(58) Field of Classification Search .......... 714/749, 714/748, 750, 751, 18, 19
See application file for complete search history.

(56) References Cited

U.S. PATENT DOCUMENTS

| 2007/0168827 A1 | 7/2007 | Lohr et al. | |
| 2007/0183451 A1* | 8/2007 | Lohr et al. | 370/473 |
| 2009/0077430 A1* | 3/2009 | Cho et al. | 714/701 |
| 2009/0177937 A1* | 7/2009 | Lee et al. | 714/748 |

FOREIGN PATENT DOCUMENTS

| KR | 10-2007-0093658 A | 9/2007 |
| WO | 2008/041822 A2 | 4/2008 |

* cited by examiner

*Primary Examiner* — Dieu-Minh Le
(74) *Attorney, Agent, or Firm* — Jefferson IP Law, LLP

(57) ABSTRACT

An apparatus and a method for supporting an HARQ scheme in a wireless communication system are provided. In a method for operating a base station, whether a resource used for a system of a different standard and a resource used for one of an HARQ reply and an HARQ retransmission packet by a synchronous HARQ scheme collide with each other is estimated. A collision packet ID is allocated to an HARQ sub-burst corresponding to one of an HARQ reply and an HARQ retransmission packet estimated to collide, and an offset of the one of the HARQ reply and the HARQ retransmission packet is changed. A MAP message including at least one of the collision packet ID, and changed offset information is generated. The MAP message is transmitted.

42 Claims, 15 Drawing Sheets

☒ RESOURCE USED FOR SYSTEM OF DIFFERENT STANDARD

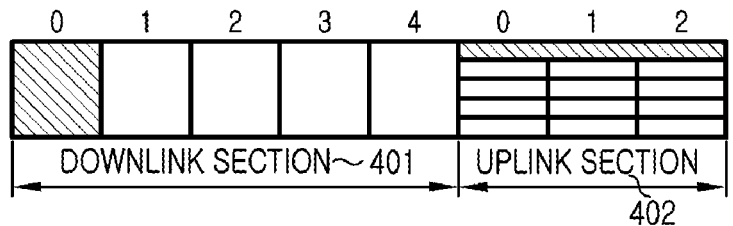
FIG.4A
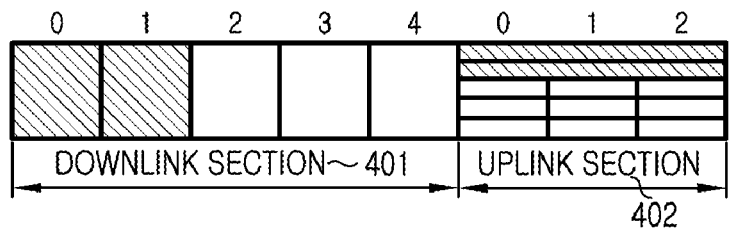
FIG.4B
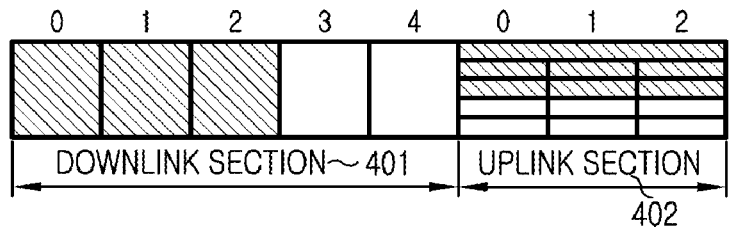
FIG.4C
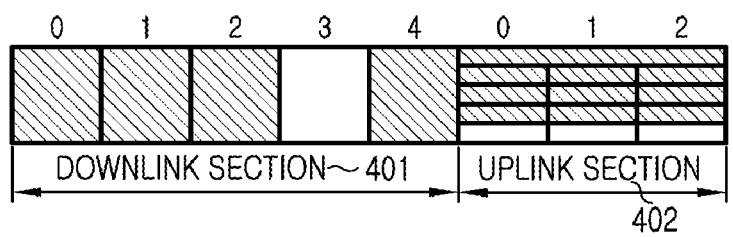
FIG.4D

APPARATUS AND METHOD FOR SUPPORTING SYNCHRONOUS HYBRID AUTOMATIC REPEAT REQUEST IN BROADBAND WIRELESS COMMUNICATION SYSTEM

PRIORITY

The present application claims the benefit under 35 U.S.C. §119(a) of a Korean patent application filed in the Korean Intellectual Property Office on Apr. 18, 2008 and assigned Serial No. 10-2008-0036029 and a Korean patent application filed in the Korean Intellectual Property Office on Apr. 18, 2008 and assigned Serial No. 10-2008-0036024, the entire disclosures of both of which are hereby incorporated by reference.

BACKGROUND OF THE INVENTION

1. Field of the Invention

The present invention relates generally to a broadband wireless communication system. More particularly, the present invention relates to an apparatus and a method for supporting a synchronous Hybrid Automatic Repeat reQuest (HARQ) technique in a broadband wireless communication system.

2. Description of the Related Art

Currently, there is active research regarding the providing of services having various Qualities of Service (QoS). More specifically, there is research for providing users with services having a transmission speed of about 100 Mbps in a $4^{th}$ Generation (4G) communication system. Particularly, active research is being conducted regarding the supporting of a high speed service in the form of guaranteeing mobility and QoS to a Broadband Wireless Access (BWA) communication system such as a wireless local area network system and a wireless metropolitan area network system. An example of a representative BWA communication system includes an Institute of Electrical and Electronics Engineers (IEEE) 802.16 system. The IEEE 802.16 system is a communication system which applies an Orthogonal Frequency Division Multiplexing (OFDM)/Orthogonal Frequency Division Multiple Access (OFDMA) scheme in order to support a broadband transmission network in a physical channel.

A broadband wireless communication system such as the IEEE 802.16 system uses a Hybrid Automatic Repeat reQuest (HARQ) technique properly combining a Forward Error Correction (FEC) technique and an Automatic Repeat reQuest (ARQ) technique in order to increase reliability of data transmission. The HARQ scheme attempts error correction of initially received data, and then determines whether to retransmit data using a simple error detection code such as a Cyclic Redundancy Check (CRC). Here, the HARQ scheme is classified into a synchronous HARQ scheme and an asynchronous HARQ scheme depending on the method of determining a resource used for initial transmission, a reply to whether an error occurs, and retransmission.

The asynchronous HARQ scheme does not fix resources used for initial transmission, a reply to whether an error occurs, and retransmission. That is, in the case where the asynchronous HARQ scheme is used, a base station should separately allocate a resource for initial transmission, a resource for a reply to whether an error occurs, and a resource for retransmission. In contrast, in the synchronous HARQ scheme, resources used for initial transmission, a reply to whether an error occurs, and retransmission are fixed by resources used for the initial transmission. That is, in the case where the synchronous HARQ scheme is used, a base station allocates only a resource for initial transmission, and does not additionally allocate resources for a reply to whether an error occurs, and retransmission. Therefore, in the case where the asynchronous HARQ scheme is used, a base station should inform a terminal of resource allocation information during retransmission. In contrast, in the case where the synchronous HARQ scheme is used, a base station does not need to inform a terminal of resource allocation information for retransmission and a reply to whether an error occurs.

In a system using a synchronous HARQ scheme, there may be a case of having to allocate a resource for a system of a different standard. For example, there may be a case where an advanced system accommodates a previous system in order to guarantee a backward compatibility. At this point, when a resource allocated to a system of a different standard is not fixed, an obstacle is generated in applying a synchronous HARQ scheme. In other words, when a base station selectively allocates some resources inside a frame to a system of a different standard depending on existence of a terminal of the system of the different standard, an obstacle is generated in applying the synchronous HARQ scheme. For example, in the case where, after initial transmission is performed, a resource for a system of a different standard is allocated to the same position of the next frame as the position of a resource of the initial transmission, a resource for retransmission and the resource for the system of the different standard collide with each other.

As described above, in the case where a system using a synchronous HARQ scheme supports a system of a different standard, a resource for retransmission or a reply to whether an error occurs may not be used. Therefore, there is a need to address an obstacle caused by resource collision in using the synchronous HARQ scheme.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for supporting a system of a different standard and simultaneously using a synchronous HARQ scheme in a broadband wireless communication system.

Another aspect of the present invention is to provide an apparatus and a method for avoiding collision between a resource for retransmission by a synchronous HARQ scheme and a resource for a system of a different standard in a broadband wireless communication system.

Still another aspect of the present invention is to provide a scheduling apparatus and a method thereof for reducing collision of a resource for synchronous HARQ when a wireless communication system provides a communication service of a different standard.

Yet another aspect of the present invention is to provide an apparatus and a method for temporarily applying an asynchronous HARQ scheme to an HARQ channel which is expected to collide in a broadband wireless communication system.

Further another aspect of the present invention is to provide an apparatus and a method for changing a reply or retransmission offset with respect to an HARQ channel which is expected to collide in a broadband wireless communication system.

Still further another aspect of the present invention is to provide an apparatus and a method for allocating a collision packet IDentifier (ID) to an HARQ channel which is expected to collide in a broadband wireless communication system.

Yet further another aspect of the present invention is to provide an apparatus and a method for discriminating an ARQ reply by a synchronous HARQ scheme and an ARQ reply by an asynchronous HARQ scheme in a broadband wireless communication system.

According to an aspect of the present invention, a method for operating a base station in a broadband wireless communication system is provided. The method includes determining whether a resource used for a system of a different standard and a resource used for one of a Hybrid Automatic Repeat reQuest (HARQ) reply and an HARQ retransmission packet by a synchronous HARQ scheme collide with each other, allocating a collision packet IDentifier (ID) to an HARQ subburst corresponding to the one of the HARQ reply and the HARQ retransmission packet estimated to collide and changing an offset of the one of the HARQ reply and the HARQ retransmission packet, generating a MAP message including at least one of resource allocation information, the collision packet ID, and changed offset information and transmitting the MAP message.

According to another aspect of the present invention, a method for operating a terminal in a broadband wireless communication system is provided. The method includes receiving a MAP message comprising at least one of a changed offset of an HARQ reply or an HARQ retransmission and collision packet Identifier (ID) for an HARQ subburst, updating an offset of the HARQ reply or the HARQ retransmission for the HARQ subburst according to the changed offset, and receiving an HARQ reply or an HARQ retransmission packet via a resource indicated by the updated offset of the HARQ reply or the HARQ retransmission.

According to still another aspect of the present invention, a method for operating a base station in a broadband wireless communication system is provided. The method includes estimating whether a resource used for a system of a different standard and one of an HARQ reply and an HARQ retransmission packet by a synchronous HARQ scheme collide with each other and, when the collision is estimated, delaying resource allocation for the system of the different standard until an HARQ process corresponding to the one of the HARQ reply and the HARQ retransmission packet is ended.

According to yet another aspect of the present invention, a base station of a broadband wireless communication system is provided. The base station includes a scheduler for determining whether a resource used for a system of a different standard and a resource of one of an HARQ reply and an HARQ retransmission packet by a synchronous HARQ scheme collide with each other, for allocating a collision packet ID to an HARQ subburst corresponding to the one of the HARQ reply and the HARQ retransmission packet estimated to collide and for changing an offset of the one of the HARQ reply and the HARQ retransmission packet, and a generator for generating a MAP message including at least one of the collision packet ID, and changed offset information, and a transmitter for transmitting the MAP message.

According to further another aspect of the present invention, a terminal of a broadband wireless communication system is provided. The terminal includes a receiver for receiving a MAP message comprising at least one of a changed offset of an HARQ reply or an HARQ retransmission and collision packet ID for an HARQ subburst, and a controller for updating an offset of the HARQ reply or the HARQ retransmission for the HARQ subburst according to the changed offset, and for controlling to receive an HARQ reply or an HARQ retransmission packet via a resource indicated by the updated offset of the HARQ reply or the HARQ retransmission.

According to still yet another aspect of the present invention, a base station of a broadband wireless communication system is provided. The base station includes a scheduler for estimating whether a resource used for a system of a different standard, and one of an HARQ reply and an HARQ retransmission packet by a synchronous HARQ scheme collide with each other, and, when the collision is estimated, delaying resource allocation for the system of the different standard until an HARQ process corresponding to the one of the HARQ reply and the HARQ retransmission packet is ended.

Other aspects, advantages and salient features of the invention will become apparent to those skilled in the art from the following detailed description, which, taken in conjunction with the annexed drawings, discloses exemplary embodiments of the invention

BRIEF DESCRIPTION OF THE DRAWINGS

The above and other aspects, features and advantages of certain exemplary embodiments of the present invention will be more apparent from the following description taken in conjunction with the accompanying drawings in which:

FIGS. 4A to 4D illustrate examples of using a frame for supporting a system of a different standard in a broadband wireless communication system according to an exemplary embodiment of the present invention;

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a technique for avoiding collision between a resource for retransmission by a synchronous HARQ scheme and a resource for a system of a different standard. Here, the system of the different standard denotes a system having a standard different from that of a system of the present invention. For example, in the case where a system according to the present invention is a system advanced from a legacy system, the legacy system may be the system of the different standard. That is, the system of the present invention and the system of the different standard may have relation of an advanced system and a legacy system. For example, the advanced system may be an IEEE 802.16m system, and the legacy system may be an IEEE 802.16e. Hereinafter, a wireless communication system using an OFDM/OFDMA scheme is illustrated by way of example. Note that exemplary embodiments of the present invention are applicable to a wireless communication system using a different scheme.

Figure 1:
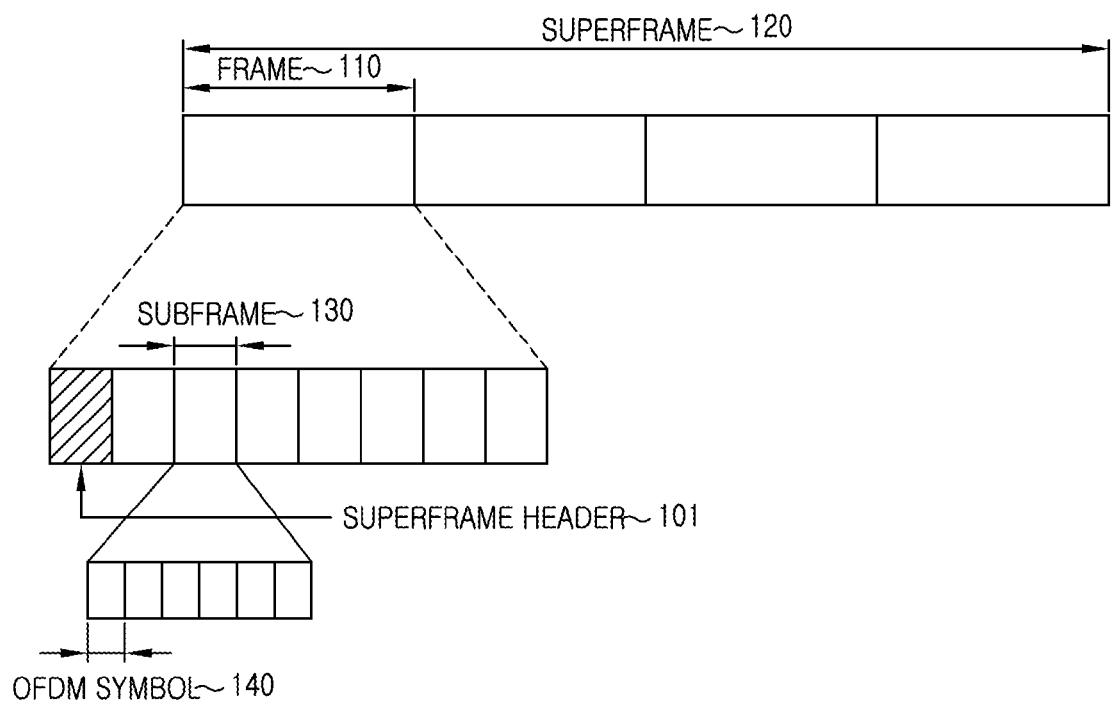
FIG. 1 illustrates a frame structure of a broadband wireless communication system according to an exemplary embodiment of the present invention.

A frame structure of a system considered in an exemplary embodiment of the present invention is illustrated in FIG. 1.

Referring to FIG. 1, there exists a frame 110 including sections for uplink communication and downlink communication. A superframe 120 includes a plurality of frames 110. The frame 110 includes a plurality of subframes 130. The sections for uplink communication and downlink communication are divided by the subframe 130. That is, in one frame 110 including K subframes 130, n subframes are used for downlink communication while (K-n) subframes are used for uplink communication. Also, the subframe 130 includes a plurality of OFDMA symbols 140. A MAP message informing of resource allocation information is transferred on a subframe basis. Also, a superframe header 101 is transmitted every superframe. Here, the superframe header 101 includes a preamble and a Broadcast CHannel (BCH).

Figure 2A:
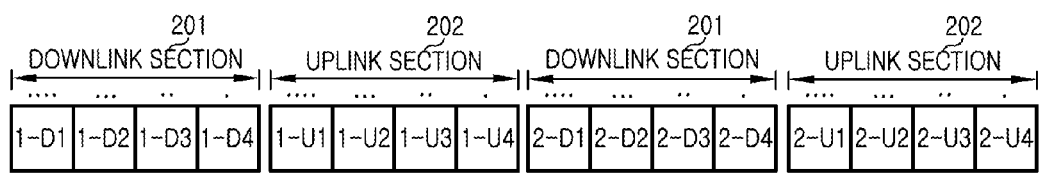
FIGS. 2A to 2C illustrate examples of using a frame of a synchronous HARQ scheme in a broadband wireless communication system according to an exemplary embodiment of the present invention.
Figure 2B:
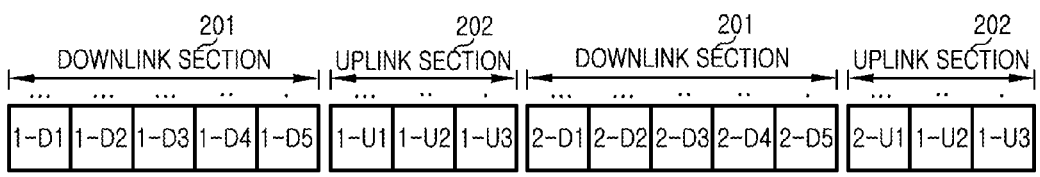
Figure 2C:
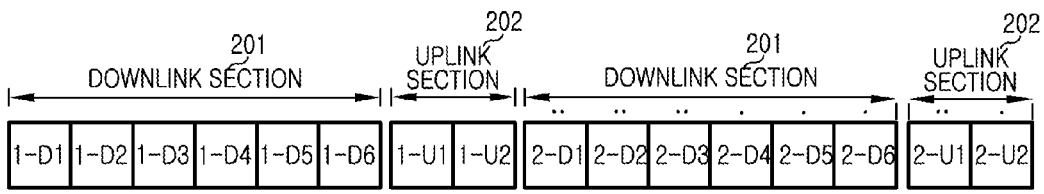

In the case where the frame of the structure illustrated in FIG. 1 is used, resources used for initial transmission, a reply to whether an error occurs, and retransmission by a synchronous HARQ scheme are illustrated in FIGS. 2A to 2C. FIG. 2A illustrates a case where a ratio of a downlink section 201 to an uplink section 202 is 4:4. FIG. 2B illustrates a case where a ratio of a downlink section 201 to an uplink section 202 is 5:3. FIG. 2C illustrates a case where a ratio of a downlink section 201 to an uplink section 202 is 6:2. In FIGS. 2A to 2C, subframes marked by the same number of dots denote subframes cooperating dependently as initial transmission is performed.

For example, in FIG. 2A, a reply, for example, ACK (ACKnowledge)/NACK(Non-ACK) to whether an error occurs with respect to a packet initially transmitted via a subframe 1-D1 is transmitted via a subframe 1-U1. A retransmission packet with respect to an initially transmitted packet is transmitted via a subframe 2-D1, and ACK/NACK is transmitted via a subframe 2-U1. In cases of FIGS. 2B and 2C, since a ratio of subframes used for downlink communication and subframes used for uplink communication is not symmetrical, a plurality of downlink subframes correspond to one uplink subframe, and a correspondence rule is determined according to a system design scheme.

Figure 3A:
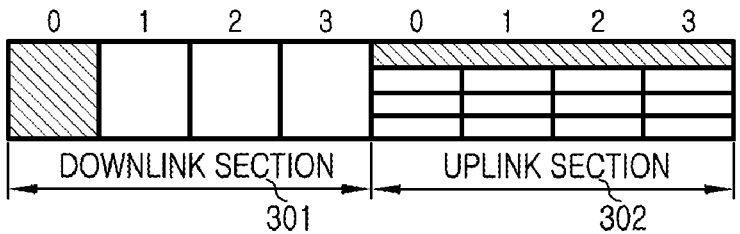
FIGS. 3A to 3C illustrate examples of using a frame for supporting a system of a different standard in a broadband wireless communication system according to an exemplary embodiment of the present invention.
Figure 3B:
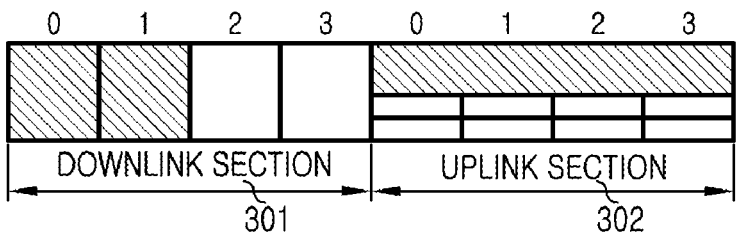
Figure 3C:
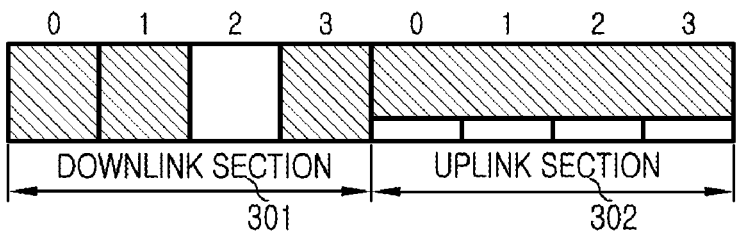

In case of supporting a system of a different standard, a frame is used as illustrated in FIGS. 3A to 3C, 4A to 4D, or 5A to 5E. FIGS. 3A to 3C illustrate cases where a ratio of a downlink section:an uplink section is 4:4. FIGS. 4A to 4D illustrate cases where a ratio of a downlink section:an uplink section is 5:3. FIGS. 5A to 5E illustrate cases where a ratio of a downlink section:an uplink section is 6:2.

In FIG. 3A, one subframe of a downlink section 301 is allocated for a system of a different standard, and a resource having a size corresponding to the one subframe in an uplink section 302 is allocated for the system of the different standard. That is, a resource for the system of the different standard is allocated in the downlink section 301 by a time division scheme, and the resource for the system of the different standard is allocated in the uplink section 302 by a frequency division scheme. As resources allocated to the system of the different standard increase, resources are divided as illustrated in FIGS. 3B and 3C. When all resources are allocated to the system of the different standards, a system according to an exemplary embodiment of the present invention operates in substantially the same way as the system of the different standard. Herein, dividing resources for each system by the frequency division scheme in the uplink section 302 is an exemplary embodiment. According to another exemplary embodiment, the division of resource for each system may be divided by a time division scheme in the uplink section 402.

However, in FIG. 3C, three subframes allocated for the system of the different standard in the downlink section are not continuous in a time axis. This is a result of allocation with consideration of a processing delay of a terminal or a base station. That is, when an HARQ packet is received via a subframe located right before the uplink section, it is difficult to secure a processing time for error test and ACK/NACK signal generation. Therefore, downlink resources and uplink resources for the system may not be continuous in the time axis in order to secure the processing time.

In FIG. 4A, one subframe of a downlink section 401 is allocated for a system of a different standard, and a resource having a size corresponding to the one subframe in an uplink section 402 is allocated for the system of the different standard. That is, a resource for the system of the different standard is allocated in the downlink section 401 by a time division scheme, and the resource for the system of the different standard is allocated in the uplink section 402 by a frequency division scheme. As resources allocated to the system of the different standard increase, resources are divided as illustrated in FIGS. 4B, 4C, and 4D. When all resources are allocated to the system of the different standards, a system according to an exemplary embodiment of the present invention operates in substantially the same way as the system of the different standard. Herein, dividing resources for each system by the frequency division scheme in the uplink section 402 is an exemplary embodiment. According to another exemplary embodiment, the division of resource for each system may be divided by the time division scheme in the uplink section 402.

However, in FIG. 4D, four subframes allocated for the system of the different standard in the downlink section are not continuous in a time axis. This is a result of allocation with consideration of a processing delay of a terminal or a base station. That is, when an HARQ packet is received via a subframe located right before the uplink section, it is difficult to secure a processing time for error test and ACK/NACK signal generation. Therefore, downlink resources and uplink resources for the system may not be continuous in the time axis in order to secure the processing time.

Figure 5A:
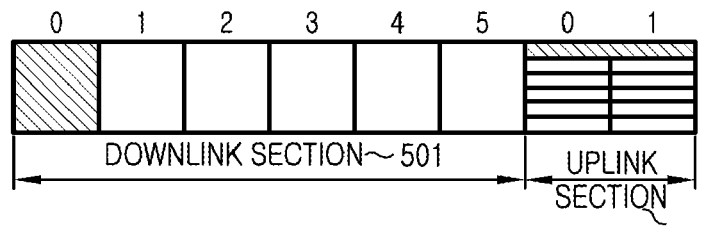
FIGS. 5A to 5E illustrate examples of using a frame for supporting a system of a different standard in a broadband wireless communication system according to an exemplary embodiment of the present invention.
Figure 5B:
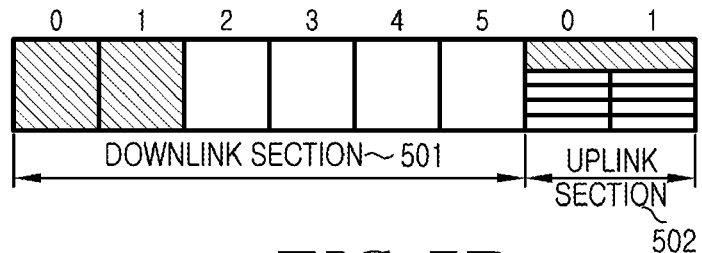
Figure 5C:
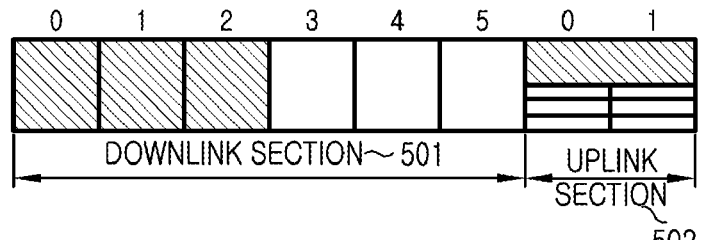

In FIG. 5A, one subframe of a downlink section 501 is allocated for a system of a different standard, and a resource having a size corresponding to the one subframe in an uplink section 502 is allocated for the system of the different standard. That is, a resource for the system of the different standard is allocated in the downlink section 501 by a time division scheme, and the resource for the system of the different standard is allocated in the uplink section 502 by a frequency division scheme. As resources allocated to the system of the different standard increase, resources are divided as illustrated in FIGS. 5B, 5C, 5D, and 5E. When all resources are allocated to the system of the different standards, a system according to an exemplary embodiment of the present invention operates in substantially the same way as the system of the different standard. Herein, dividing resources for each system by the frequency division scheme in the uplink section 402 is an exemplary embodiment. According to another exemplary embodiment, the division of resource for each system may be divided by the time division scheme in the uplink section 402.

Figure 5D:
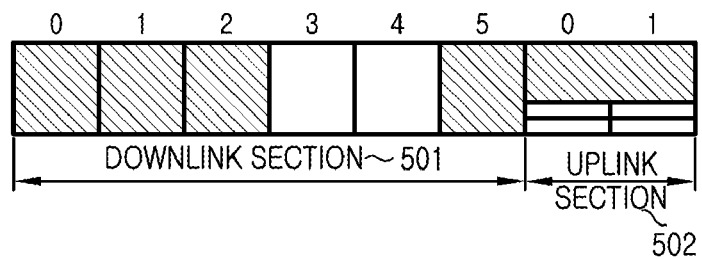
Figure 5E:
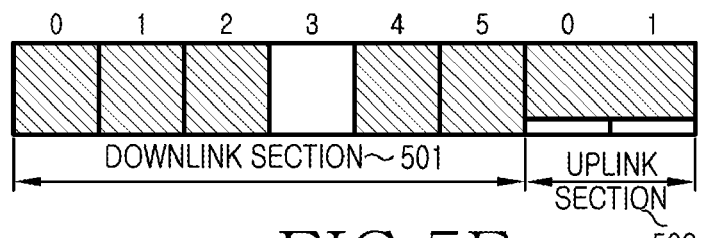

However, in FIG. 5D or 5E, subframes allocated for the system of the different standard in the downlink section are not continuous in a time axis. This is a result of allocation with consideration of a processing delay of a terminal or a base station. That is, when a packet is received via a subframe located right before the uplink section, it is difficult to secure a processing time for error test and ACK/NACK signal generation. Therefore, downlink resources and uplink resources for the system may not be continuous in the time axis in order to secure the processing time.

A system according to an exemplary embodiment of the present invention uses the frame having the structure of FIG. 1 in a fashion illustrated in FIGS. 2A to 5E in order to support a system of a different standard. Particularly, referring to FIGS. 2A to 2C, time points for ACK/NACK transmission and retransmission packet transmission are determined depending on an initial transmission point of a packet according to a synchronous HARQ scheme. At this point, in the case where resources are used for a system of a different standard as illustrated in FIGS. 3A to 5E, a subframe through which ACK/NACK and a retransmission packet should be transmitted according to a synchronous HARQ scheme, and a resource used for a system of a different standard may collide. Therefore, a system has a function of avoiding the collision. To avoid the collision, the system delays transmission of data estimated to collide through resource scheduling, or temporarily applies an asynchronous HARQ scheme to HARQ ACK/NACK or an HARQ retransmission packet estimated to collide.

Figure 6A:
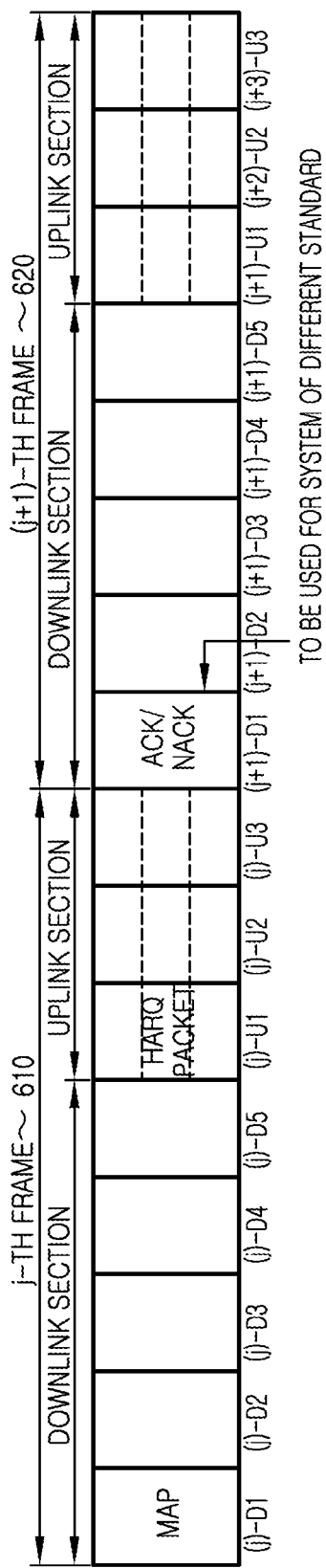
FIGS. 6A and 6B illustrate examples of using a frame for avoiding resource collision in a broadband wireless communication system according to an exemplary embodiment of the present invention.

First, an exemplary process of delaying transmission of data estimated to collide through resource scheduling is described with reference to FIGS. 6A and 6B. FIG. 6A illustrates a case of uplink HARQ packet transmission, and FIG. 6B illustrates a case of downlink HARQ packet transmission.

Referring to FIG. 6A, in a subframe (j)-D1, a base station transmits a MAP message including resource allocation information for HARQ packet transmission through a subframe (j)-U1. At this point, it is assumed that during the j-th frame 610, a terminal of a system of a different standard requests a service. The base station determines to support the system of the different standard in a (j+1)-th frame 620, and thus determines to allocate a subframe (j+1)-D1 of the (j+1)-th frame 620 for the system of the different standard. After that, the base station receives an HARQ packet from the terminal via the subframe (j)-U1. Accordingly, the base station determines to transmit a reply to the HARQ packet, that is, ACK/NACK via the subframe (j+1)-D1 of the (j+1)-th frame 620 according to the synchronous HARQ scheme. However, the base station recognizes that the subframe (j+1)-D1 is a predefined resource for use for the system of the different standard, and may not be used for transmission of ACK/NACK. In other words, the base station recognizes resource collision. Therefore, to avoid the collision, the base station delays resource allocation for the system of the different standard. That is, the base station does not perform support for the system of the different standard via the subframe (j+1)-D1, but gives priority to the transmission of ACK/NACK. At this point, when the reception of the HARQ packet is successful, ACK is transmitted via the subframe (j+1)-D1, and the base station performs support for the system of the different standard from a (j+2)-th frame. In contrast, when the reception of the HARQ packet is not successful, NACK is transmitted via the subframe (j+1)-D1, and the base station delays resource allocation for the system of the different standard until the reception of the HARQ packet is successful. In other words, the base station delays resource allocation for the system of the different standard until an HARQ process corresponding to the HARQ packet is ended. In FIG. 6A, in the uplink section, resources used for the system of the different standard in the uplink section are divided in a frequency axis. However, division in the frequency axis is exemplary, and the resources used for the system of the different standard in the uplink section may be divided in a time axis.

Figure 6B:
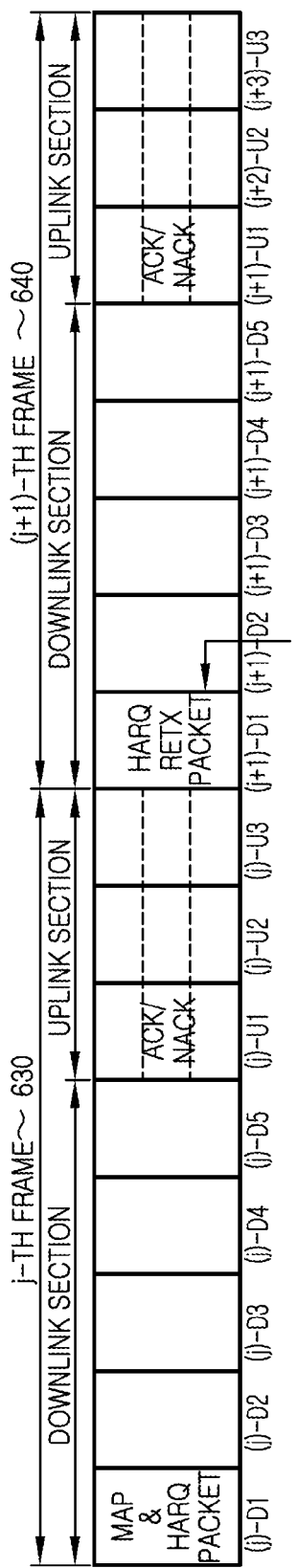

Referring to FIG. 6B, in a subframe (j)-D1, a base station transmits a MAP message including resource allocation information for HARQ packet transmission through a subframe (j)-D1, and an HARQ packet. At this point, it is assumed that during the j-th frame 630, a terminal of a system of a different standard requests a service. The base station determines to support the system of the different standard in a (j+1)-th frame 640, and determines to use a subframe (j+1)-D1 of the (j+1)-th frame 640 for the system of the different standard. After that, the base station receives ACK/NACK from the terminal through a subframe (j)-U1. At this point, it is assumed that NACK is received. The base station determines that an HARQ retransmission packet should be transmitted via the subframe (j+1)-D1 of the (j+1)-th frame 640 according to the synchronous HARQ scheme. However, the base station recognizes that the subframe (j+1)-D1 is a predetermined resource for use for the system of the different standard, and may not be used for transmission of ACK/NACK. That is, the base station recognizes resource collision. Therefore, to avoid the collision, the base station delays resource allocation for the system of the different standard. That is, the base station does not support the system of the different standard in the subframe (j+1)-D1, but gives priority to the transmission of the HARQ retransmission packet. The base station receives ACK/NACK through a subframe (j+1)-U1. At this point, when reception of the HARQ retransmission packet is successful, that is, when ACK is received, transmission of the HARQ packet is completed, and the base station supports the system of the different standard in a (j+2)-th frame. In contrast, when the reception of the HARQ retransmission packet is not successful, that is, when NACK is received, the HARQ retransmission packet is transmitted in the (j+2)-th frame, and the base station delays resource allocation for the system of the different standard until the reception of the HARQ packet is successful. In other words, the base station delays resource allocation for the system of the different standard until an HARQ process corresponding to the HARQ reply is ended. In FIG. 6B, in the uplink section, resources used for the system of the different standard in the uplink section are divided in a frequency axis. However, division in the frequency axis is exemplary, and the resources used for the system of the different standard in the uplink section may be divided in a time axis.

Figure 7A:
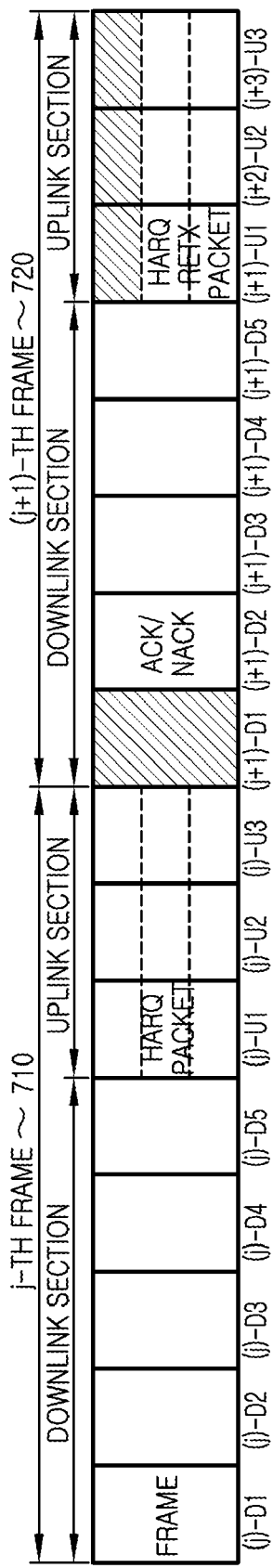
FIGS. 7A and 7B illustrate examples of using a frame for avoiding resource collision in a broadband wireless communication system according to an exemplary embodiment of the present invention.
Figure 7B:
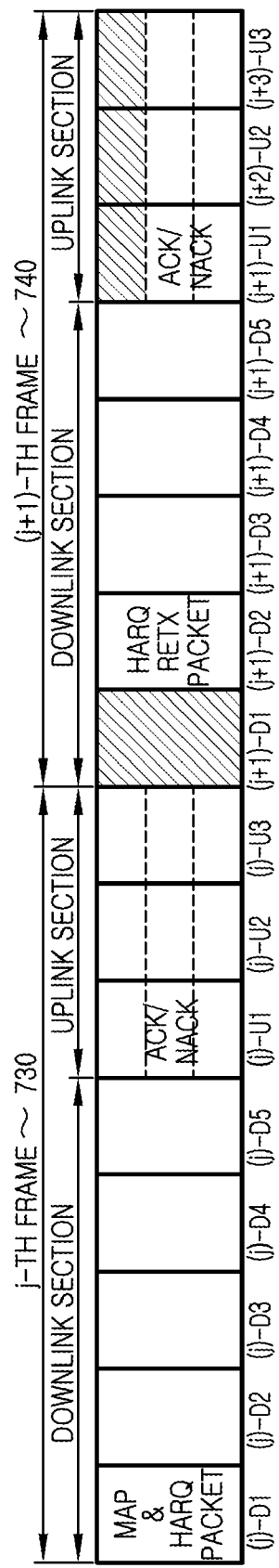

Next, an exemplary process of temporarily applying an asynchronous HARQ scheme is described with reference to FIG. 7. FIG. 7A illustrates a case of uplink HARQ packet transmission, and FIG. 7B illustrates a case of downlink HARQ packet transmission.

Referring to FIG. 7A, in a subframe (j)-D1, a base station transmits a MAP message including resource allocation information for HARQ packet transmission through a subframe (j)-U1. At this point, when allocating a resource to a (j)-th frame 710, the base station recognizes that a subframe (j+1)-D1 is to be used for a system of a different standard and so estimates that ACK/NACK in response to an HARQ packet may not be transmitted via the subframe (j+1)-D1, that is, a collision will occur. Therefore, the base station determines to temporarily apply an asynchronous HARQ scheme to the HARQ packet to be transmitted via the subframe (j)-U1. Accordingly, the base station allocates a collision packet ID to an HARQ channel of the HARQ packet, and changes a reply offset of the HARQ packet. That is, in the case where the synchronous HARQ scheme is applied, the reply offset is effectively set to 0, and, in the case where the asynchronous HARQ scheme is applied, the reply offset is changed to a value equal to or greater than 1. Here, a unit of the offset is a subframe.

In other words, the base station allocates the collision packet ID to the HARQ channel of the HARQ packet, and transmits a MAP message including resource allocation information for HARQ packet transmission via the subframe (j)-D1 and the collision packet ID. Simultaneously, in (j)-th frame 720, the base station broadcasts information informing of the supporting of the system of the different standard. Here, the information informing the system that the different standard is supported includes information informing that a service for the system of the different standard starts and information regarding an amount of resources for the system of the different standard. For example, the base station may use a 'legacy mode transition indicator' defined in the IEEE 802.16m standard as the information informing of the service start of the system of the different standard. Here, the legacy mode transition indicator may be a variable set to true depending on determination of a resource to be used for the system of the different standard. Therefore, during allocation of resources, the base station recognizes that some resources of the (j+1)-th frame 720 are used for the system of the different standard through the legacy mode transition indicator. When the base station transmits a MAP message, a terminal determines that a resource for HARQ packet transmission has been allocated via the subframe (j)-D1 using the MAP message. After that, in the subframe (j)-U1, the terminal transmits an HARQ packet to the base station via the allocated resource.

In the subframe (j+1)-D1, the base station performs communication with a terminal of a system that uses a different standard. Subsequently, the base station transmits ACK/NACK to the terminal. Here, ACK/NACK is a reply to the HARQ packet transmitted via the subframe (j)-U1, and should be transmitted via the subframe (j+1)-D1 according to a rule of a synchronous HARQ scheme. However, since the subframe (j+1)-D1 is used for the system of the different standard, the base station transmits ACK/NACK through a subframe (j+1)-D2. At this point, ACK/NACK to an HARQ packet transmitted through a subframe (j)-U2 will be transmitted via the subframe (j+1)-D2. That is, in the subframe (j+1)-D2, both ACK/NACK to the HARQ packet transmitted via the subframe (j)-U1 and ACK/NACK to the HARQ packet transmitted via the subframe (j)-U2 are transmitted.

Therefore, in the subframe (j+1)-D2, the base station transmits ACK/NACK to the HARQ packet received via the subframe (j)-U2 according to the synchronous HARQ scheme, and transmits ACK/NACK to the HARQ packet received via the subframe (j)-U1 and resource allocation information including the collision packet ID of the HARQ packet according to the temporary asynchronous HARQ scheme. Here, the resource allocation information denotes a resource for ACK/NACK to the HARQ packet received via the subframe (j)-U1. Therefore, the terminal confirms a collision packet ID using the MAP message received via the subframe (j)-D1, confirms a resource for ACK/NACK to an HARQ packet transmitted via the subframe (j)-U1 using the collision packet ID, and then receives ACK/NACK. When NACK is received, the terminal transmits an HARQ retransmission packet via the subframe (j+1)-U1. At this point, the form of the HARQ retransmission packet changes depending on a retransmission scheme. The retransmission scheme may be an HARQ Chase Combining (CC) scheme or an HARQ Incremental Redundancy (IR) scheme.

In FIG. 7A, resources used for the system of the different standard in the uplink section are divided along a frequency axis. However, division in the frequency axis is exemplary, and the resources used for the system of the different standard in the uplink section may be divided along a time axis. In this case, like ACK/NACK, an HARQ retransmission packet collides. Therefore, the base station allocates a resource for transmission of an HARQ retransmission packet to a subframe (j+1)-U2, and incorporates a collision packet ID into resource allocation information.

Referring to FIG. 7B, in the subframe (j)-D1, the base station transmits a MAP message including resource allocation information for an HARQ packet and the HARQ packet via the subframe (j)-D1. At this point, when allocating resources of a (j)-th frame 730, the base station recognizes that the subframe D1 of the j+1)-th frame 740 is used for the system of the different standard, and thus estimates that the HARQ packet may not be retransmitted via the subframe (j+1)-D1 when reception of the HARQ packet is not successful. Therefore, the base station determines to temporarily apply an asynchronous HARQ scheme to the HARQ packet to be transmitted via the subframe (j)-D1. Accordingly, the base station allocates a collision packet ID to an HARQ channel of the HARQ packet, and changes a retransmission offset. That is, in the case where the synchronous HARQ scheme is applied, the retransmission offset is effectively set to 0. However, in the case where the asynchronous HARQ scheme is applied, the retransmission offset is changed to a value equal to or greater than 1. Here, a unit of the offset is a subframe.

In other words, the base station allocates the collision packet ID to the HARQ channel of the HARQ packet, and then transmits a MAP message including resource allocation information for HARQ packet transmission via the subframe (j)-D1 and the collision packet ID and the HARQ packet. Simultaneously, the base station broadcasts a mode transition indicator, and ratio information of a resource in a frame used for a system of a different standard through a (j)-th frame 730. Accordingly, a terminal confirms that a resource of the subframe (j)-D1 is allocated to receive the HARQ packet using the MAP message, and then receives the HARQ packet from the base station via the allocated resource. After that, in the subframe (j)-U1, the terminal transmits ACK/NACK with respect to the HARQ packet. At this point, it is assumed that NACK has been transmitted.

In the subframe D1 of the j+1)-th frame 740, the base station performs communication with a terminal of a system of a different standard. In a subframe (j+1)-D2, the base station transmits an HARQ retransmission packet to the terminal. Here, the HARQ retransmission packet is transmitted in response to NACK transmitted in the subframe (j)-U1, and should be transmitted via the subframe (j+1)-D1 according to a rule of the synchronous HARQ scheme. However, since the subframe (j+1)-D1 is used for the system of the different standard, the base station transmits the HARQ retransmission packet through a subframe (j+1)-D2. At this point, an HARQ retransmission packet in response to NACK transmitted through a (j)-U2 will be also transmitted via the subframe (j+1)-D2. That is, in the subframe (j+1)-D2, both the HARQ retransmission packet due to NACK transmitted via the subframe (j)-U1 and the HARQ retransmission packet due to NACK transmitted via the subframe (j)-U2 are transmitted.

Therefore, in the subframe (j+1)-D2, the base station transmits the HARQ retransmission packet by NACK received via the subframe (j)-U2 according to the synchronous HARQ scheme, and transmits the HARQ retransmission packet by NACK received via the subframe (j)-U1 and resource allocation information including a collision packet ID of NACK received via the subframe (j)-U1 according to the temporary asynchronous HARQ scheme. Accordingly, the terminal confirms the collision packet ID using the MAP message received via the subframe (j)-D1, confirms a resource for the HARQ retransmission packet by NACK transmitted via the subframe (j)-U1 from a MAP message of the subframe (j+1)-D2 using the collision packet ID, and then receives the HARQ retransmission packet. The terminal transmits ACK/NACK with respect to the retransmitted HARQ packet through a subframe (j+1)-U1.

In FIG. 7B, in the uplink section, resources used for the system of the different standard in the uplink section are divided in a frequency axis. However, division in the frequency axis is exemplary, and the resources used for the system of the different standard in the uplink section may be divided in a time axis. In this case, like an HARQ retransmission packet, ACK/NACK with respect to an HARQ retransmission packet collides. Therefore, the base station allocates a resource for transmission of ACK/NACK with respect to an HARQ retransmission packet to a subframe (j+1)-U2, and incorporates a collision packet ID into resource allocation information.

According to an exemplary embodiment of the present invention described with reference to FIG. 7, the temporary asynchronous HARQ scheme is applied. The asynchronous HARQ scheme is applied to only an HARQ process estimated to collide. After an HARQ process according to the temporary asynchronous HARQ scheme is ended, a new HARQ process conforms to the synchronous HARQ scheme again. At this point, an exemplary embodiment of the present invention includes a signaling procedure for the temporary asynchronous HARQ scheme. The signaling procedure is described below.

Figure 8:
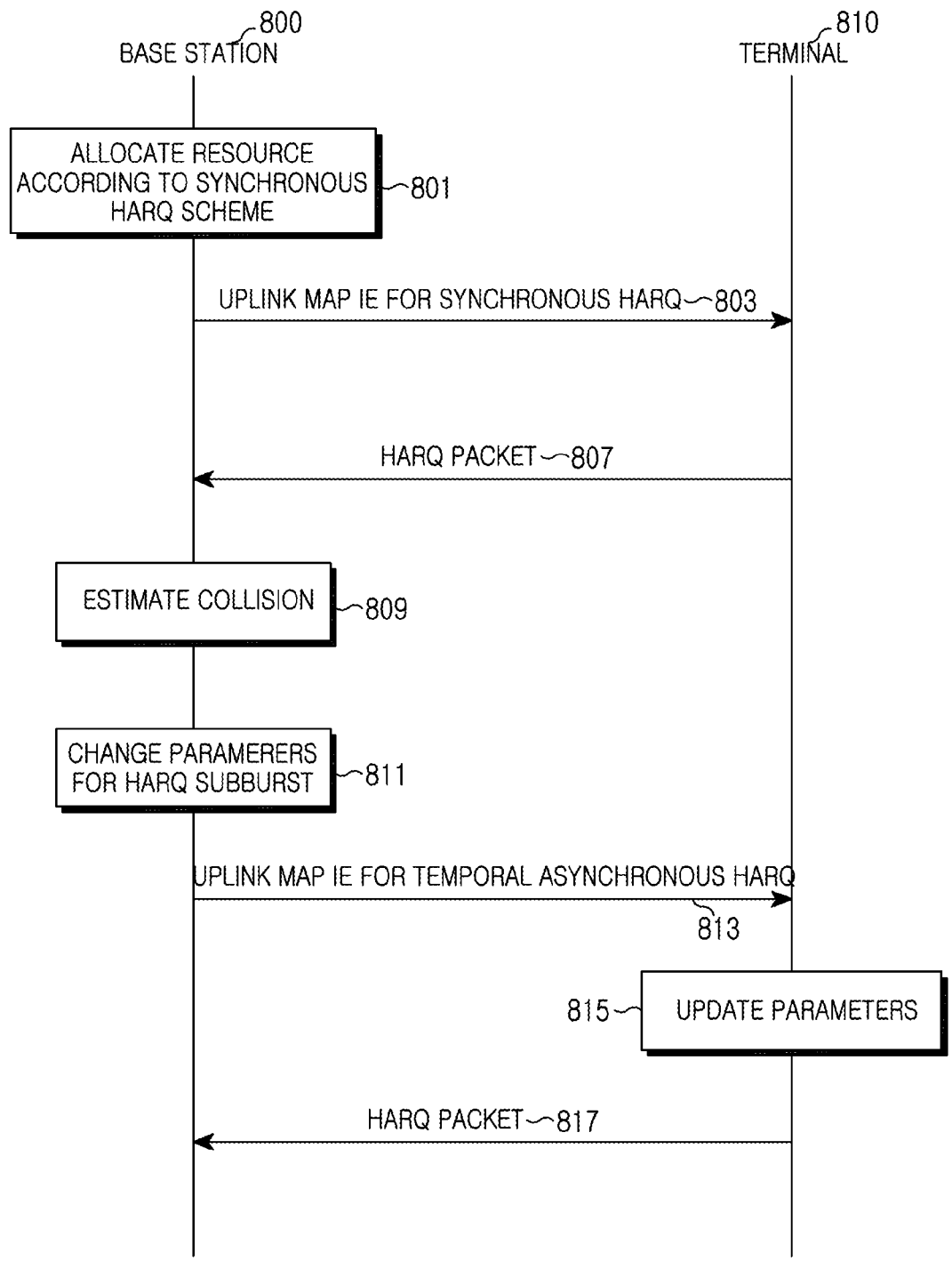
FIG. 8 illustrates signaling for avoiding resource collision in a broadband wireless communication system according to an exemplary embodiment of the present invention.

FIG. 8 illustrates signaling for avoiding resource collision in a broadband wireless communication system according to an exemplary embodiment of the present invention. FIG. 8 illustrates an example of uplink communication.

Referring to FIG. 8, a base station 800 allocates a resource according to the synchronous HARQ scheme in step 801. That is, the base station 800 allocates a resource with an HARQ reply offset of an HARQ subburst set to 0. Accordingly, the base station 800 transmits uplink MAP IE for the synchronous HARQ scheme in step 803. For example, uplink MAP IE for the synchronous HARQ scheme is illustrated in Table 1 below.

TABLE 1

| Parameters | Size (bits) | Description |
| --- | --- | --- |
| HARQ_UL-MAP_IE( ){ | | |
|   Extended-2 UIUC | 4 | |
|   Length | 8 | In bytes |
|   RCID_Type | 2 | 0b00: Normal CID |
|   while (data remains){ | | |

TABLE 1-continued

| Parameters | Size (bits) | Description |
| --- | --- | --- |
| Mode | 3 | Indicates the mode of this IE<br>0b111: HARQ Legacy Transition IE |
| Allocation Start Indication | 1 | 0: No allocation start information<br>1: Allocation start information follows |
| If (Allocation Start Indication ==1){ | | |
|   OFDMA symbol offset | 8 | Indicates start symbol offset of HARQ subburst |
|   Subchannel offset | 7 | Indicates start subchannel offset of HARQ subburst |
|   Reserved | 1 | Set to zero |
| } | | |
| N sub-bursts | 4 | Number of sub-bursts in this HARQ UL MAP IE |
| For (i=0;Number of subbursts;i++){ | | |
|   If (Mode){ | | |
|     MAP message IE | | Each MAP message IE mode operation |
|   } | | |
| } | | |
| Padding | | Padding to byte; set to 0 |
| } | | |
| } | | |

A terminal 810 which has received uplink MAP IE illustrated in Table 1 confirms a resource allocated for HARQ packet transmission through uplink MAP IE in step 805. Herein, the MAP IE illustrated in Table 1 is unicasted to a corresponding terminal for HARQ initial packet transmission when allocating resources according to the synchronous HARQ scheme. Explaining essential parameters of the MAP IE in Table 1, 'Extended-2 UIUC' represents a purpose of a MAP IE. For instance, 'Extended-2 UIUC' indicates one of a resource allocation for Multiple Input Multiple Output (MIMO), power control, and so on. Therefore, by using 'Extended-2 UIUC', the base station 800 may indicate an uplink MAP IE for asynchronous HARQ scheme, that is, a legacy transition IE described below. 'Reduced Connection Identifier (RCID) type' represents whether using RCID which has a purpose to reduce a size of the MAP IE when Multicast CID (MCID) or Basic CID (BCID) is used. However, in exemplary embodiment of the present invention, since the MCID or BCID is not used, the RCID is not used. 'Mode' represents an HARQ retransmission scheme, that is, one of CC and IR. The terminal 810 which has received uplink MAP IE transmits an HARQ packet through the confirmed resource in step 807.

The base station 800 estimates collision between a resource through which ACK/NACK to the HARQ packet should be transmitted, and a resource used in step 809. Accordingly, the base station 800 changes parameters for the HARQ subburst of the terminal 800 according to the synchronous HARQ scheme at present time in step 811. That is, the base station 800 changes the HARQ reply offset of the HARQ subburst to a non-0 value in order to avoid the collision The base station 800 transmits uplink MAP IE for the temporal asynchronous HARQ scheme in step 813. The uplink MAP IE for the temporal asynchronous HARQ scheme may be transmitted in a collision-expected frame or a previous frame of the collision-expected frame. In case of transmitting in the previous frame, the uplink MAP IE is transmitted via a subframe in which HARQ reply is transmitted. In case of transmitting in the collision-expected frame, the uplink MAP IE is transmitted via a subframe in which HARQ reply according to the changed offset is transmitted. For example, uplink MAP IE for the temporal asynchronous HARQ scheme is illustrated in Table 2 below.

TABLE 2

| Parameters | Size (bit) | Description |
| --- | --- | --- |
| HARQ_Legacy_Transition_IE ( ){ | | |
|   Extended-2 UIUC | 4 | |
|   Length | 8 | In bytes |
|   CPID | 4 | Collision Packet Identifier |
|   ACK CH Subframe Offset | 2 | Changed offset of ACK CH in order to avoid a collision |
|   OFDMA symbol offset | 8 | Changed offset in OFDMA symbol axis for a resource HARQ retransmission packet in order to avoid a collision |
|   Subchannel offset | 7 | Changed offset in subchannel symbol axis for a resource HARQ retransmission packet in order to avoid a collision |
|   No. OFDMA symbols | 5 | Number of OFMA symbols allocated |
|   No. subchannels | 4 | Number of subchannels allocated |
|   Padding | | Padding to byte; set to 0 |
| } | | |

The terminal 810 which has received uplink MAP IE illustrated in Table 2 confirms that the asynchronous HARQ scheme is applied through uplink MAP IE. A MAP IE in Table 2 is used in order to avoid the collision by using temporal asynchronous HARQ scheme when supporting the system of the different standard. 'CPID' is used to distinguish collision-expected HARQ packets. Additionally, since a collision between an ACK channel and resource may be expected to occur, a change of the ACK channel is informed using 'ACH CH Subframe Offset'. When 2 bits are allocated to the 'ACH CH Subframe Offset', the ACK channel could be relocated in the range of 4 subframes. 'OFDMA symbol offset' and 'subchannel offset' represent a change of resource for transmitting HARQ retransmission packet. However, depending on a resource allocation scheme, the 'OFDMA symbol offset' would be omitted. In addition, when resources for each system are divided by the frequency division scheme in the uplink section, 'Subframe Offset' would substitute the 'OFDMA symbol offset'

The terminal 810 updates parameters for the HARQ sub-burst so that resource collision does not occur in step 815. The terminal 810 transmits an HARQ packet through the allocated resource according to changed parameters in step 817. After the parameters are changed, the terminal 810 applies the synchronous HARQ scheme based on the changed parameters.

The following exemplary embodiments of the present invention are described in more detail to illustrate operation procedures of a base station and a terminal which use an HARQ scheme according to the above-described scheme with reference to the accompanying drawings.

Figure 9:
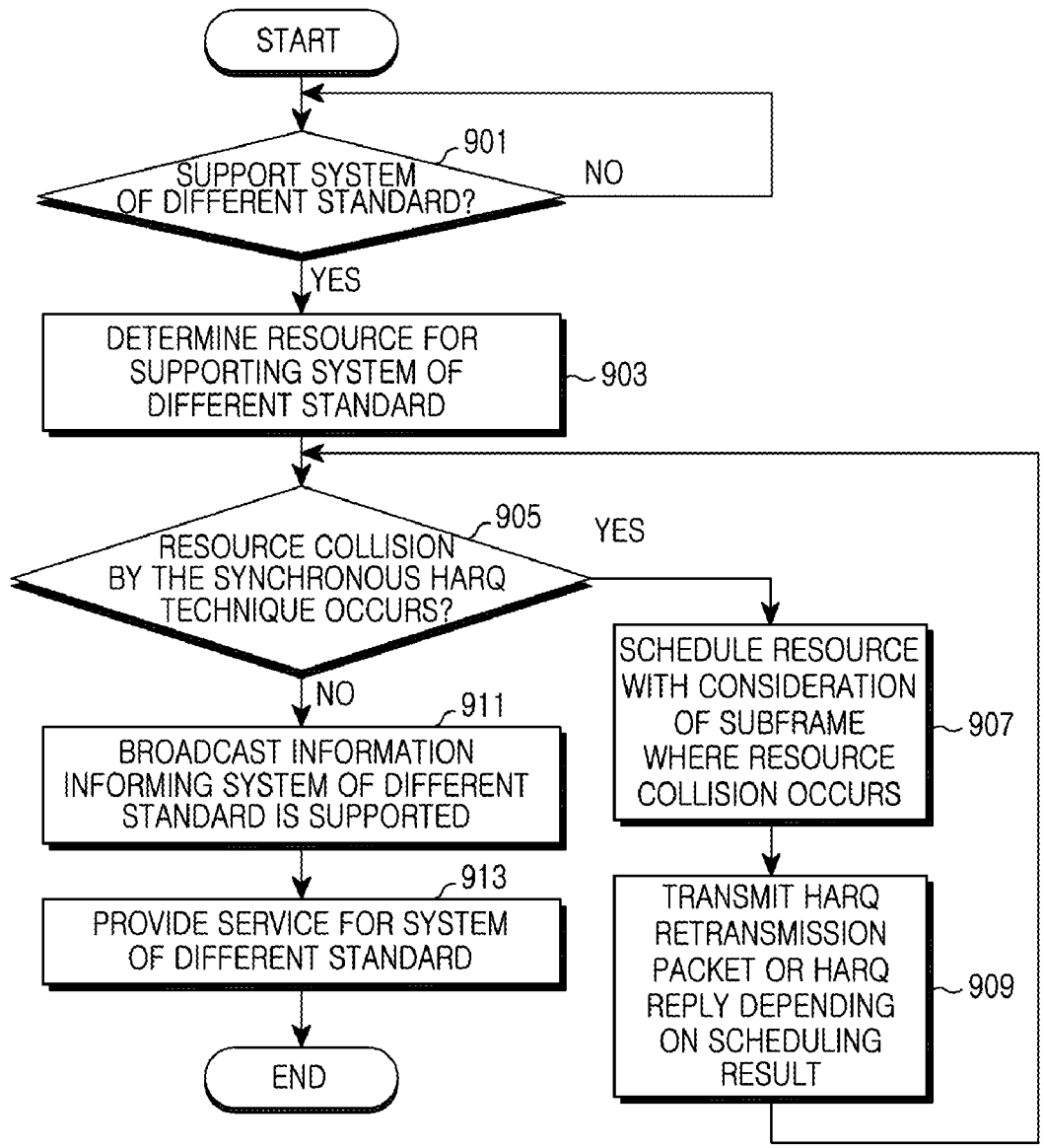
FIG. 9 is a flowchart illustrating an operation procedure of a base station in a broadband wireless communication system according to an exemplary embodiment of the present invention.

FIG. 9 illustrates an operation procedure of a base station in a broadband wireless communication system according to an exemplary embodiment of the present invention.

Referring to FIG. 9, in step 901, the base station determines whether to perform support for a system of a different standard. For example, the base station determines whether a terminal of a different standard to which a service may be provided by the base station requests a service.

When supporting the system of the different standard, in step 903, the base station determines an amount of a resource to be allocated for supporting the system of the different standard. At this point, the amount of the resource for the system of the different standard is determined on a subframe basis. However, in case of an uplink section, the base station may use a bandwidth corresponding to a subframe size as a basis.

After determining the amount of the resource to be used for supporting the system of the different standard, in step 905, the base station determines whether resource collision by the synchronous HARQ scheme occurs. In other words, the base station determines whether an HARQ reply or an HARQ retransmission packet should be transmitted through a resource intended for the system of the different standard.

When the resource collision occurs, in step 907, the base station performs resource scheduling with consideration of a subframe where the resource collision occurs. That is, the base station performs the resource scheduling such that data transmission of the system of the different standard through the resource intended for the system of the different standard is delayed, and priority is given to transmission of an HARQ reply or an HARQ retransmission packet according to the synchronous HARQ scheme. In other words, the base station temporarily suspends resource allocation to the rest except the HARQ reply or the HARQ retransmission packet among data to be transmitted via the subframe where the resource collision occurs.

After performing the resource scheduling, in step 909, the base station transmits the HARQ reply or the HARQ retransmission packet according to a scheduling result. That is, the base station delays service providing for the system of the different standard via the subframe scheduled to be used for the system of the different standard, and transmits the HARQ retransmission packet or the HARQ reply according to the synchronous HARQ scheme.

The base station returns to step 905 and determines again whether resource collision by the synchronous HARQ scheme occurs. That is, when packet transmission is completed by the HARQ retransmission packet transmitted in step 909, the resource collision does not occur. When the packet transmission is not completed, the resource collision occurs again. When the resource collision occurs, the base station performs step 907.

In contrast, when the resource collision does not occur, in step 911, the base station broadcasts information informing that the base station supports the system of the different standard. Here, the information informing that the base station supports the system of the different standard includes information informing that a service for the system of the different standard starts and information informing that an amount of a resource intended for the system of the different standard. For example, the base station may use a legacy mode transition indicator defined in an IEEE 802.16m standard as the information informing that the service for the system of the different standard starts.

After informing of the supporting of the system of the different standard, in step 913 the base station provides a service for the system of the different standard through some of the subframes inside a frame.

As described with reference to FIG. 9, to avoid collision between a resource for the system of the different standard and a resource for the synchronous HARQ scheme, the base station delays providing service for the system of the different standard until transmission of an HARQ retransmission packet is completed. At this point, to reduce a frequency of retransmitting a packet using a resource to be allocated for the system of the different standard, the base station performs scheduling as illustrated in FIG. 10.

Figure 10:
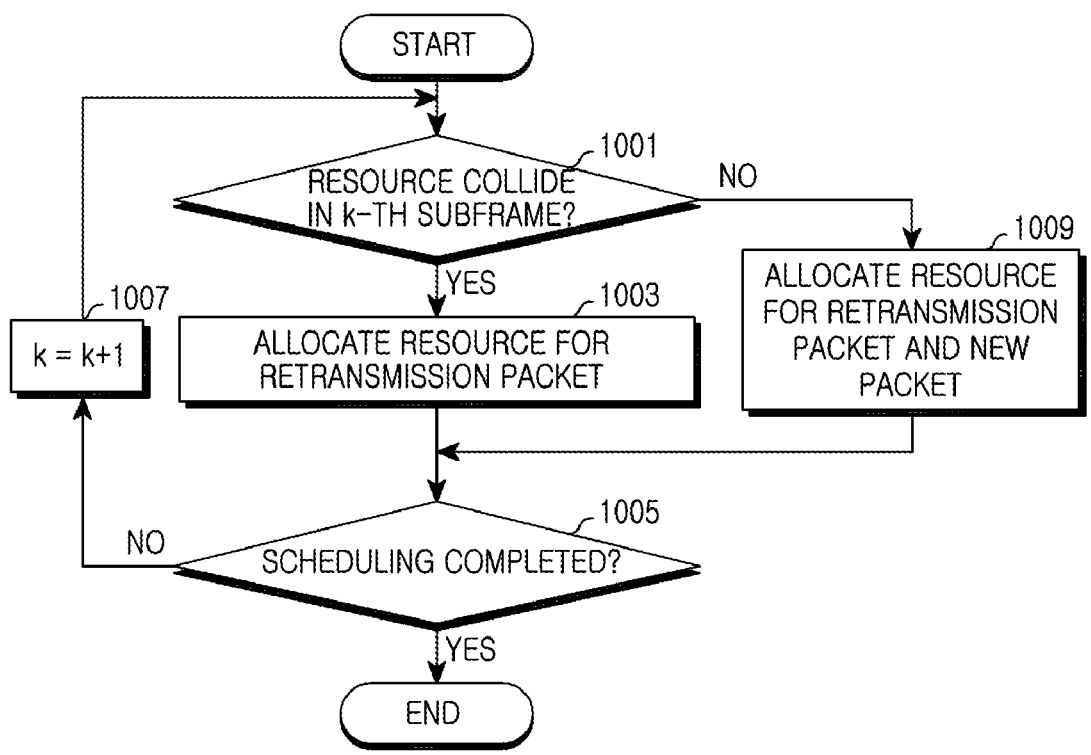
FIG. 10 is a flowchart illustrating a scheduling procedure of a base station in a broadband wireless communication system according to an exemplary embodiment of the present invention.

FIG. 10 illustrates a scheduling procedure of a base station in a broadband wireless communication system according to an exemplary embodiment of the present invention.

Referring to FIG. 10, in step 1001, the base station determines whether resource collision occurs in a k-th subframe. In other words, the base station determines whether packet retransmission according to the synchronous HARQ scheme should be performed through the k-th subframe and simultaneously the k-th subframe is allocated as a resource for a system of a different standard. That is, the base station determines whether collision with a resource allocated for the synchronous HARQ scheme occurs due to allocation of a resource for the system of the different standard in the k-th subframe. For example, the base station determines whether the resource of the k-th subframe is allocated for the system of the different standard by checking a resource collision indicator of the k-th subframe. Here, k is an index of a subframe and is initialized to 1 when the present procedure starts.

When the k-th subframe is allocated for the system of the different standard, in step 1003, the base station performs scheduling such that only a retransmission packet according to the synchronous HARQ scheme is transmitted through the k-th subframe. That is, the base station performs scheduling such that data transmission of the system of the different standard through the resource allocated for the system of the different standard is delayed, and only the retransmission packet is transmitted. In other words, the base station temporarily suspends resource allocation for the rest except the retransmission packet among data to be transmitted through the k-th subframe.

In step 1005, the base station determines whether resource allocation of all subframes has been completed. When the resource allocation of all subframes has not been completed, in step 1007, the base station increases k by 1 and then returns to step 1001.

In contrast, when it is determined that the k-th subframe is not allocated as a resource for the system of the different standard in step 1001, the base station performs scheduling such that an HARQ retransmission packet and new packet are transmitted through the k-th subframe in step 1009. In step 1005, the base station determines whether resource allocation of all of the subframes has been completed. At this point, when the resource allocation of all of the subframes has been completed, the base station ends the present procedure.

Figure 11:
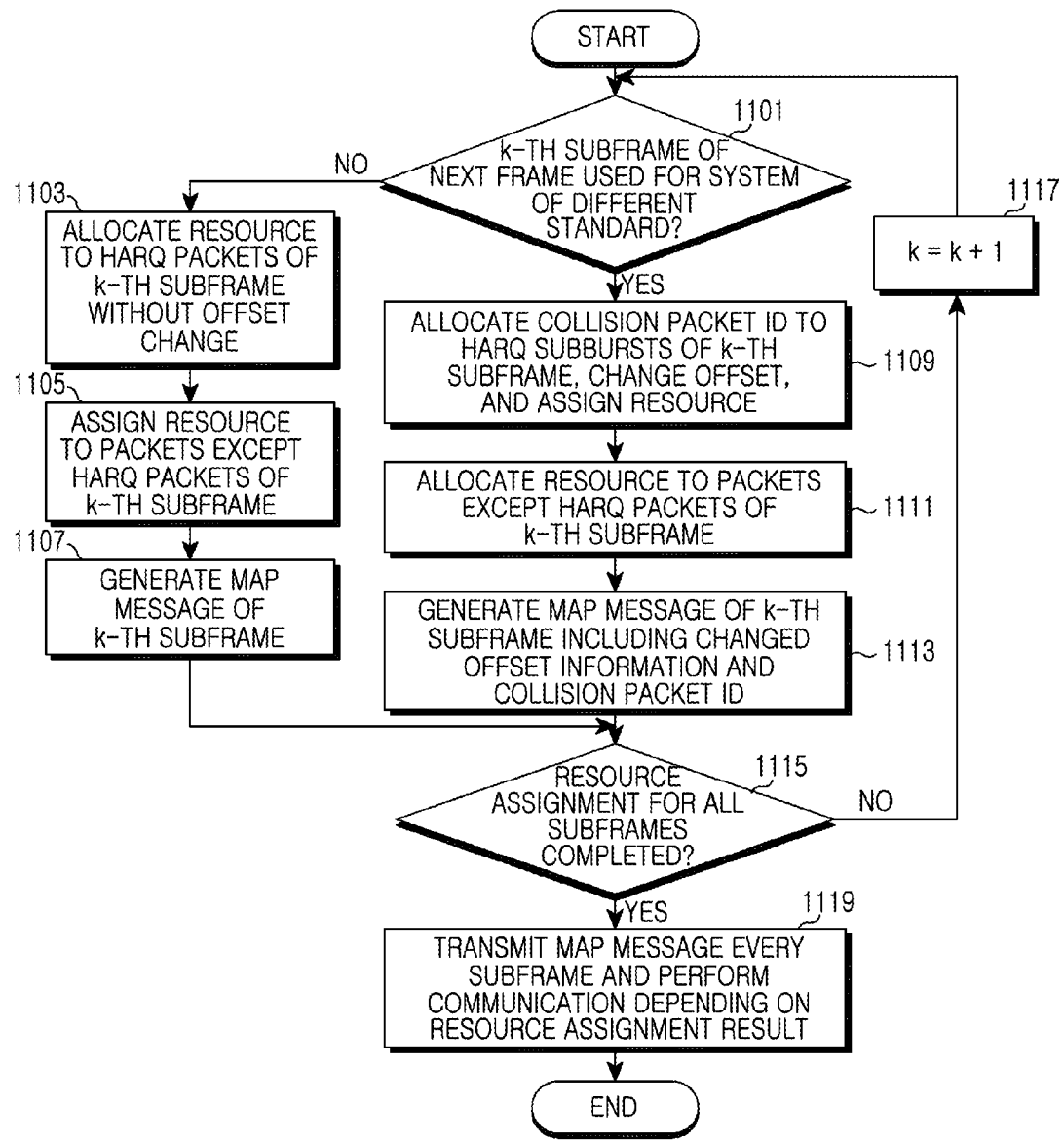
FIG. 11 is a flowchart illustrating an operation procedure of a base station in a previous frame of a collision-expected frame in a broadband wireless communication system according to an exemplary embodiment of the present invention.

FIG. 11 illustrates an operation procedure of a base station in a previous frame of a collision-expected frame in a broadband wireless communication system according to an exemplary embodiment of the present invention.

Referring to FIG. 11, in step 1101, the base station determines whether a k-th subframe of the next frame is used for a system of a different standard. That is, the base station estimates whether a resource for the system of the different standard collides with a resource for ACK/NACK or an HARQ retransmission packet according to the synchronous HARQ scheme. At this point, the base station determines whether some of subframes of the next frame are used for the system of the different standard with reference to a mode transition indicator, and determines the position of a subframe used for the system of the different standard with reference to resource ratio information. Here, k is initialized to 1 when the present procedure starts.

When the k-th subframe of the next frame is not used for the system of the different standard, in step 1103, the base station allocates a resource to HARQ packets of the k-th subframe without collision packet ID allocation and offset change. At this point, the HARQ packets of the k-th subframe include both HARQ packets transmitted through a k-th downlink subframe and HARQ packets transmitted through an uplink subframe corresponding to the k-th downlink subframe.

After allocating a resource to the HARQ packets, in step 1105, the base station allocates a resource to packets except the HARQ packet of the k-th subframe.

In step 1107, the base station generates a MAP message of the k-th subframe. That is, the base station generates the MAP message representing resource allocation results performed in steps 1103 and 1105. Then, the base station performs step 1115.

In step 1101, when it is determined that the k-th subframe of the next frame is used for the system of the different standard, in step 1109, the base station allocates a collision packet IDs to HARQ subbursts of HARQ packets of the k-th subframe, changes a retransmission offset, and allocates a resource. That is, the base station allocates the collision packet ID in order to temporarily apply the asynchronous HARQ scheme to the ACK/NACKs or the HARQ packets of the k-th subframe. That is, the base station allocates the collision packet ID to the HARQ subburst corresponding to ACK/NACK or an HARQ retransmission packet estimated to collide, and changes an offset.

In step 1111, the base station allocates a resource to packets except the HARQ packets of the k-th subframe.

In step 1113, the base station generates a MAP message of the k-th subframe including at least one of the collision packet ID and changed offset information. For example, the base station generates the MAP message including a MAP IE as illustrated Table 2. That is, the base station generates the MAP message representing resource allocation results performed in steps 1109 and 1111.

After generating the MAP message, in step 1115, the base station determines whether resource allocation for all subframes has been completed. When the resource allocation for all the subframes has not been completed, in step 1117, the base station increases k by 1, and returns to step 1101.

In contrast, when the resource allocation of all the subframes has been completed, in step 1119, the base station transmits a MAP message every subframe, and performs communication according to a resource allocation result. That is, during a downlink section, the base station transmits HARQ packets, HARQ replies, HARQ retransmission packets, and non-HARQ packets, and during an uplink section, receives HARQ packets, HARQ replies, HARQ retransmission packets, and non-HARQ packets.

In operation of the base station as described with reference to FIG. 11, a MAP IE for a temporal asynchronous HARQ scheme is transmitted in a previous frame of a collision-expected frame. According to another exemplary embodiment of the present invention, the MAP IE for the temporal asynchronous HARQ scheme may be transmitted in the collision-expected frame. In this case, the base station transmits the MAP IE for the temporal asynchronous HARQ scheme via a subframe determined by the changed offset among subframes in the collision-expected frame.

Figure 12:
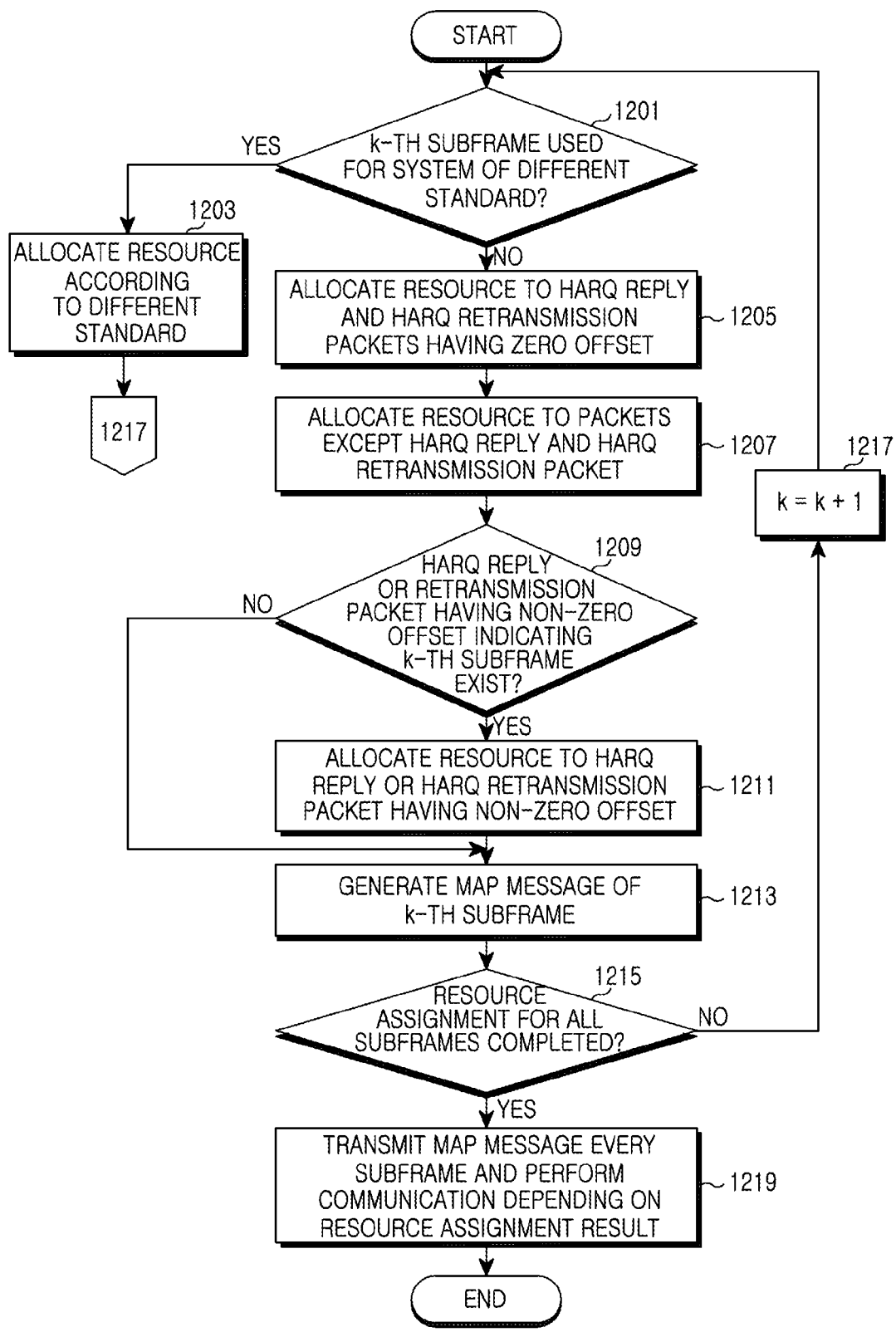
FIG. 12 is a flowchart illustrating an operation procedure of a base station in a collision-expected frame in a broadband wireless communication system according to an exemplary embodiment of the present invention.

FIG. 12 illustrates an operation procedure of a base station in a collision-expected frame in a broadband wireless communication system according to an exemplary embodiment of the present invention.

Referring to FIG. 12, in step 1201, the base station determines whether a k-th subframe is a subframe used for a system of a different standard. Here, k is initialized to 1 when the present procedure starts.

When it is determined that the k-th subframe is the subframe used for the system of the different standard, in step 1203, the base station allocates a resource of the k-th subframe according to the different standard. Then, the base station performs step 1217.

In contrast, when it is determined that the k-th subframe is not the subframe used for the system of the different standard, in step 1205, the base station allocates a resource to an HARQ reply and an HARQ retransmission packet having a non-zero offset. That is, the base station allocates the resource to the HARQ reply and the HARQ retransmission packet to which the synchronous HARQ scheme is applied.

In step 1207, the base station allocates a resource to a packet except the HARQ reply and the HARQ retransmission packet. For example, the base station allocates a resource to an HARQ packet and a non-HARQ packet.

In step 1209, the base station determines whether there exists an HARQ reply or an HARQ retransmission packet having a non-zero offset which indicates the k-th subframe. That is, the base station determines whether there exists the HARQ reply or the HARQ retransmission packet to which the asynchronous HARQ scheme is applied and which is to be transmitted through the k-th subframe. When there does not exist the HARQ reply or the HARQ retransmission packet having a non-zero offset which indicates the k-th subframe, the base station proceeds to step 1213.

In contrast, when there exists the HARQ reply or the HARQ retransmission packet having a non-zero offset which indicates the k-th subframe, in step 1211, the base station allocates a resource to the HARQ reply or the HARQ retransmission packet having a non-zero offset.

In step 1213, the base station generates a MAP message for the k-th subframe. That is, the base station generates the MAP message representing resource allocation results performed in steps 1205 and 1211.

After generating the MAP message, in step 1215, the base station determines whether resource allocation of all subframes has been completed. When the resource allocation of all the subframes has not been completed, in step 1217, the base station increases k by 1 and returns to step 1201.

In contrast, when the resource allocation of all the subframes has been completed, in step 1219, the base station transmits a MAP message every subframe, and performs communication according to the resource allocation result. That is, during a downlink section, the base station transmits HARQ packets, HARQ replies, HARQ retransmission packets, and non-HARQ packets, and during an uplink section, receives HARQ packets, HARQ replies, HARQ retransmission packets, and non-HARQ packets. At this point, in a subframe where ACK/NACK or an HARQ retransmission packet corresponding to the collision packet ID is transmitted, the base station transmits a MAP message including the collision packet ID.

Figure 13:
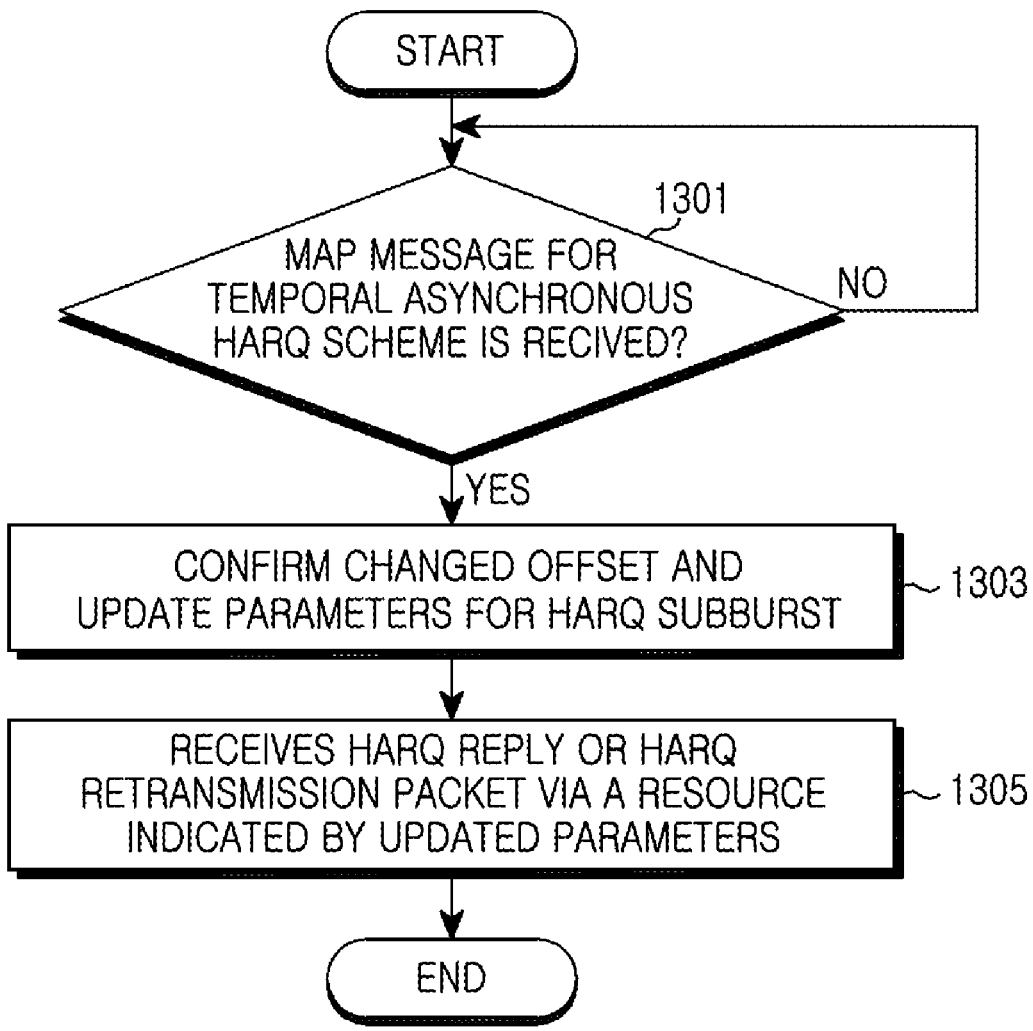
FIG. 13 is a flowchart illustrating an operation procedure of a terminal in a broadband wireless communication system according to an exemplary embodiment of the present invention.

FIG. 13 illustrates an operation procedure of a terminal in a broadband wireless communication system according to an exemplary embodiment of the present invention.

Referring to FIG. 13, in step 1301, the terminal determines whether a MAP message for a temporal asynchronous HARQ scheme is received. The terminal has at least one HARQ subburst according to a synchronous HARQ scheme, and determines whether the MAP message to change ACK/NACK offset or retransmission offset of the HARQ subburst. For instance, the MAP message for the temporal asynchronous HARQ scheme includes a MAP IE as illustrated in Table 2.

When the MAP message for the temporal asynchronous HARQ scheme is received, in step 1303, the terminal confirms information on changed offset included in the MAP message. Then, the terminal updates parameters for the HARQ subburst according to the information.

After updating the parameters, in step 1305, the terminal receives an HARQ reply or an HARQ retransmission packet via a resource indicated by updated parameters. Herein, the synchronous HARQ scheme is applied to the HARQ subburst based on updated parameters. Therefore, after updating the parameters, the terminal applies the synchronous HARQ scheme to the HARQ subburst based on updated parameters.

Now, exemplary embodiments of the present invention are described in more detail to illustrate constructions of a base station and a terminal which use the HARQ scheme according to the above-described scheme with reference to the accompanying drawings.

Figure 14:
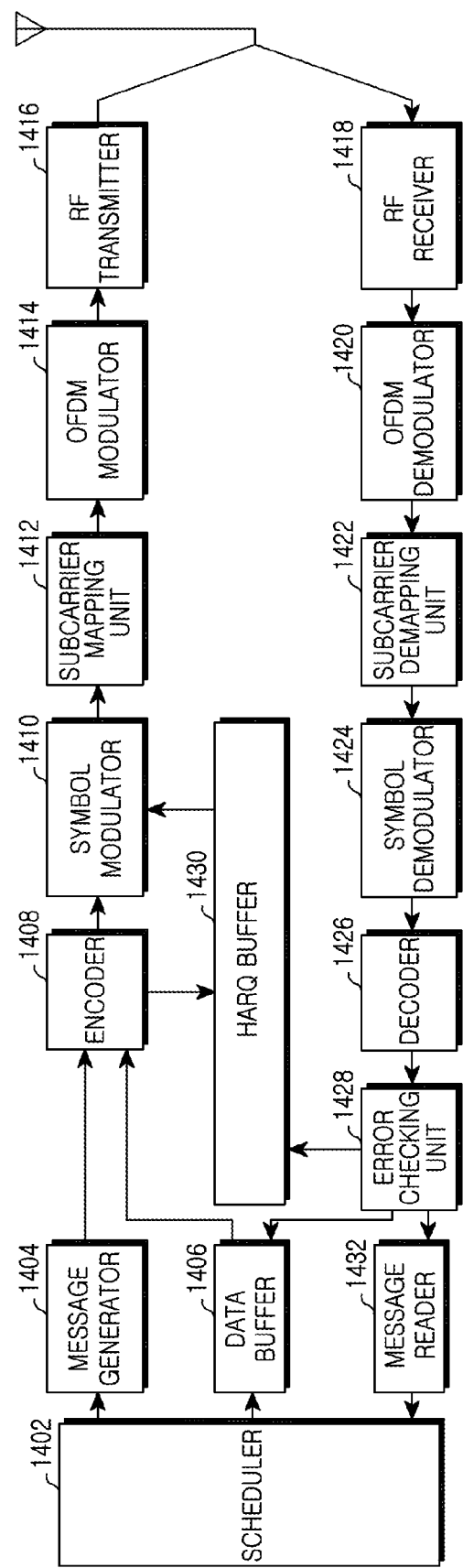
FIG. 14 is a block diagram illustrating a base station in a broadband wireless communication system according to an exemplary embodiment of the present invention.

FIG. 14 illustrates a block diagram of a base station in a broadband wireless communication system according to an exemplary embodiment of the present invention.

Referring to FIG. 14, the base station includes a scheduler 1402, a message generator 1404, a data buffer 1406, an encoder 1408, a symbol modulator 1410, a subcarrier mapping unit 1412, an OFDM modulator 1414, a Radio Frequency (RF) transmitter 1416, an RF receiver 1418, an OFDM demodulator 1420, a subcarrier demapping unit 1422, a symbol demodulator 1424, a decoder 1426, an error checking unit 1428, an HARQ buffer 1430, and a message reader 1432.

The scheduler 1402 allocates resources inside a frame to terminals. Also, in the case where a terminal of a system of a different standard requests a service, the scheduler 1402 determines a point of time to support the system of the different standard and allocates a resource to be used for the system of the different standard in a frame in which the service for the system of the different standard is performed. Accordingly, the scheduler 1402 sets a mode transition indicator. In allocating resources, the scheduler 1402 allocates a resource for the system of the different standard by a time division scheme in a downlink section, and allocates a resource for the system of the different standard by a frequency division scheme in an uplink section. In addition, the scheduler 1402 allocates a resource for transmitting an HARQ initial transmission packet according to a synchronous HARQ scheme. Particularly, the scheduler 1402 estimates collision between a resource for ACK/NACK or an HARQ retransmission packet and the resource for the system of the different standard, and performs scheduling for avoiding the collision.

According to an exemplary embodiment of the present invention, the scheduler 1402 performs resource scheduling such that data transmission of the system of the different standard through the resource for the system of the different standard is delayed, and priority is given to transmission of an HARQ reply or an HARQ retransmission packet according to the synchronous HARQ scheme. In other words, the scheduler 1402 temporarily suspends resource allocation to the rest except the HARQ reply or the HARQ retransmission packet among data to be transmitted via the subframe where the collision occurs. At this point, the delay of a service for the system of the different standard continues until reception of the HARQ packet is successful.

According to an exemplary embodiment of the present invention, the scheduler 1402 temporarily applies the asynchronous HARQ scheme to ACK/NACK or an HARQ retransmission packet estimated to collide. That is, the scheduler 1402 estimates whether a resource used for a system of a different standard, and an HARQ reply or an HARQ retransmission packet according to the synchronous HARQ scheme collide with each other, and allocates a collision packet ID to an HARQ subburst corresponding to the HARQ reply or the HARQ retransmission packet estimated to collide. Also, the scheduler 1402 changes an offset of ACK/NACK or an HARQ retransmission packet for the HARQ subburst. In other words, the scheduler 1402 applies the temporal asynchronous HARQ scheme to the HARQ subburst by performing a collision packet ID allocation and offset change which are not performed in the synchronous HARQ scheme. At this point, the scheduler 1402 estimates collision by checking whether some subframes of the next frame are used for the system of the different standard with reference to a mode transition indicator, and checking whether the subframe used for the system of the different standard has the same position as that of a subframe through which the HARQ reply or the HARQ retransmission packet is transmitted with reference to ratio information of the resource. In addition, during allocation of a resource of a subframe in the frame in which the service for the system of the different standard is performed, the scheduler 1402 allocates a resource to the one of an HARQ reply and an HARQ retransmission packet when there exists one of the HARQ reply and the HARQ retransmission packet having a non-zero offset indicating the subframe, The message generator 1404 generates a control message to be transmitted to a terminal. For example, the message generator 1404 generates a message for each subframe including resource allocation information. When performing resource allocation according to the synchronous HARQ scheme, the message generator 1404 generates a MAP message including resource allocation information according to the synchronous HARQ scheme. For instance, the resource allocation information according to the synchronous HARQ scheme includes a MAP IE as illustrated in Table 1. Also, the message generator 1404 generates control information including a mode transition indicator to be transmitted from a previous frame of a frame which uses a resource for the system of the different standard, and ratio information of a resource used for the system of the different standard. Particularly, when applying the temporal asynchronous HARQ scheme according to an exemplary embodiment of the present invention in order to avoid the collision, the message generator 1404 generates a MAP message including at least one of a collision packet ID and a changed offset. For example, the MAP message for the temporal asynchronous HARQ scheme includes a MAP IE as illustrated in Table 2. The MAP message for the temporal asynchronous HARQ scheme may be transmitted in a frame in which is the service of the system of the different standard is provided or a previous frame of a frame in which the service of the system of the different standard is provided.

The data buffer 1406 temporarily stores data to be transmitted to a terminal and data received from the terminal, and outputs stored data to the encoder 1408 depending on a resource allocation result of the scheduler 1402. The encoder 1408 channel-codes an information bit row provided from the message generator 1404 and the data buffer 1406. The symbol modulator 1410 modulates the channel-coded bit row and converts the same into complex symbols. The subcarrier mapping unit 1412 maps the complex symbols to a frequency domain depending on a resource allocation result of the scheduler 1402. The OFDM modulator 1414 converts the complex symbols mapped to the frequency domain into signals in a time domain by performing Inverse Fast Fourier Transform (IFFT), and forms OFDM symbols by inserting a Cyclic Prefix (CP). The RF transmitter 1416 up-converts a baseband signal into an RF signal, and transmits the RF signal via an antenna.

The RF receiver 1418 down-converts an RF signal received via the antenna into a baseband signal. The OFDM demodulator 1420 divides signals provided from the RF receiver 1418 on an OFDM symbol basis, removes a CP, and recovers complex symbols mapped to the frequency domain by performing FFT. The subcarrier demapping unit 1422 extracts signals mapped to a resource allocated to the terminal itself from the complex symbols mapped to the frequency domain. The symbol demodulator 1424 converts the complex symbols into a bit row by demodulating the complex symbols. The decoder 1426 channel-decodes the bit row. The error checking unit 1428 determines whether an error of a received packet occurs.

The HARQ buffer 1430 temporarily stores a received uplink HARQ packet in order to combine with an HARQ retransmission packet, and temporarily stores an HARQ packet generated for transmission of a downlink HARQ retransmission packet. That is, the HARQ buffer 1430 stores a downlink HARQ packet generated by the encoder 1408, and provides the downlink HARQ retransmission packet to the symbol modulator 1410 during retransmission. Also, the HARQ buffer 1430 stores an uplink HARQ packet provided from the symbol demodulator 1424, and deletes the stored uplink HARQ packet depending on reception success notice of the error checking unit 1428. The message reader 1432 reads a control message received from the terminal. For example, the message reader 1432 confirms ACK/NACK to a downlink HARQ packet, received from the terminal, and informs the scheduler 1402 of whether transmission of the downlink HARQ packet is successful.

Figure 15:
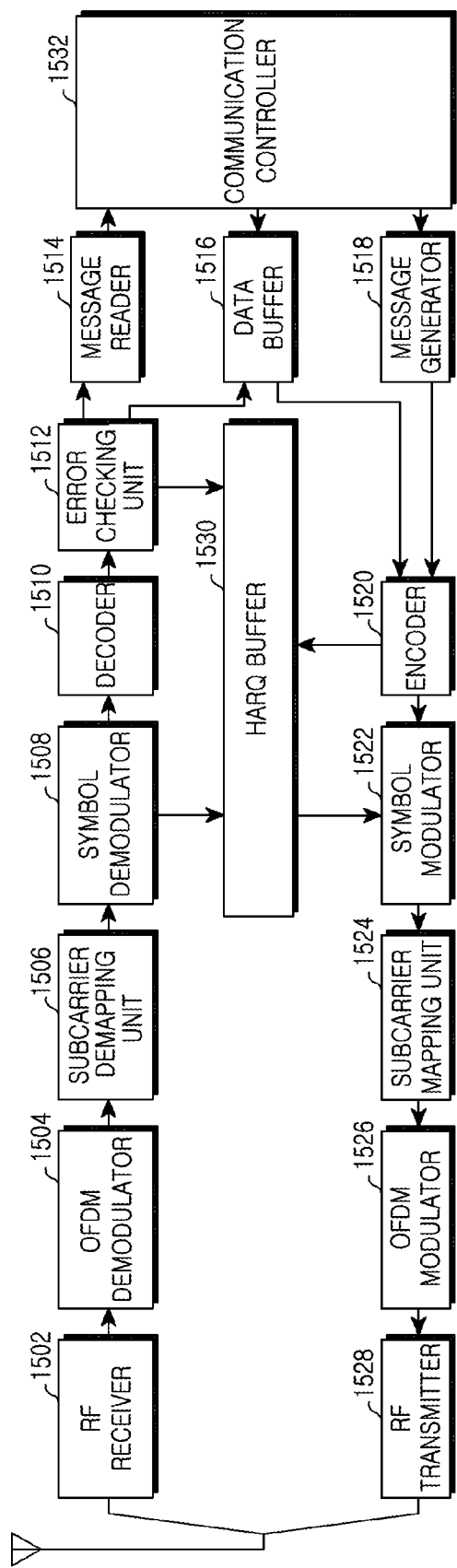
FIG. 15 is a block diagram illustrating a terminal in a broadband wireless communication system according to an exemplary embodiment of the present invention.

FIG. 15 illustrates a block diagram of a terminal in a broadband wireless communication system according to an exemplary embodiment of the present invention.

Referring to FIG. 15, the terminal includes an RF receiver 1502, an OFDM demodulator 1504, a subcarrier demapping unit 1506, a symbol demodulator 1508, a decoder 1510, an error checking unit 1512, a message reader 1514, a data buffer 1516, a message generator 1518, an encoder 1520, a symbol modulator 1522, a subcarrier mapping unit 1524, an OFDM modulator 1526, an RF transmitter 1528, an HARQ buffer 1530, and a communication controller 1532.

The RF receiver 1502 down-converts an RF signal received via an antenna into a baseband signal. The OFDM demodulator 1504 divides signals provided from the RF receiver 1502 on an OFDM symbol basis, removes a CP, and recovers complex symbols mapped to the frequency domain by performing FFT. The subcarrier demapping unit 1506 extracts signals mapped to a resource allocated to the terminal itself from the complex symbols mapped to the frequency domain. The symbol demodulator 1508 converts the complex symbols into a bit row by demodulating the complex symbols. The decoder 1510 channel-decodes the bit row. The error checking unit 1512 determines whether an error of a received packet occurs.

The message reader 1514 reads a control message received from a base station. For example, the message reader 1514 confirms ACK/NACK to an uplink HARQ packet, received from the base station, and informs the communication controller 1532 of whether transmission is successful. Also, the message reader 1514 confirms resource allocation information by reading a MAP message received from the base station every subframe, and provides the resource allocation information to the communication controller 1532. For instance, the message reader 1514 confirms the resource allocation according to the synchronous HARQ scheme through a MAP ID as illustrated in Table 1. Particularly, according to an exemplary embodiment of the present invention, when a MAP message to change an ACK/NACK offset or a retransmission offset of an HARQ subburst is received, the message reader 1514 confirms information on changed offset included in the MAP message. The MAP message may be transmitted in a frame in which is the service of the system of the different standard is provided or a previous frame of a frame in which the service of the system of the different standard is provided. For instance, the MAP message includes a MAP IE as illustrated in Table 2.

The data buffer 1516 temporarily stores data to be transmitted to the base station and data received from the base station, and outputs the stored data to the encoder 1520 according to a control of the communication controller 1532. The message generator 1518 generates a control message to be transmitted to the base station. For example, the message generator generates ACK/NACK to a downlink HARQ packet.

The encoder 1520 channel-codes an information bit row provided from the message generator 1504 and the data buffer 1506. The symbol modulator 1522 converts a channel-coded bit row into complex symbols by modulating the channel-coded bit row. The subcarrier mapping unit 1524 maps the complex symbols into the frequency domain. The OFDM modulator 1526 converts the complex symbols mapped into the frequency domain into signals in the time domain by performing IFFT, and forms OFDM symbols by inserting a CP. The RF transmitter 1528 up-converts a baseband signal into an RF signal, and transmits the RF signal via the antenna.

The HARQ buffer 1530 temporarily stores a received downlink HARQ packet in order to combine with an HARQ retransmission packet, and temporarily stores an uplink HARQ packet generated for transmission of an HARQ retransmission packet. That is, the HARQ buffer 1530 stores an uplink HARQ packet generated by the encoder 1520, and provides an HARQ retransmission packet to the symbol modulator 1522 during retransmission. Also, the HARQ buffer 1530 stores a downlink HARQ packet provided from the symbol demodulator 1508, and deletes the received downlink HARQ packet depending on reception success notice of the error checking unit 1512.

The communication controller 1532 controls an operation for communication of the terminal. That is, the communication controller 1532 controls an output of the data buffer 1516 according to resource allocation information confirmed by the message reader 1514. Also, the communication controller 1532 controls the message generator 1518 to generate ACK/NACK depending on an error check result of the error checking unit 1512. Particularly, according to an exemplary embodiment of the present invention, when a MAP message to change an ACK/NACK offset or a retransmission offset for an HARQ subburst is received, the communication controller 1532 updates the ACK/NACK offset or the retransmission offset for the HARQ subburst according to information on changed offset, and controls to receive an ACK/NACK or an HARQ retransmission packet via a resource indicated by the changed offset. At this time, the communication controller 1532 applies the synchronous HARQ scheme to the HARQ subburst based on the changed offset. In addition, the communication controller 1532 determines a subframe used for a system of a different standard through a mode transition indicator and ratio information of a resource received from a previous frame of a frame used for the system of the different standard. Accordingly, the communication controller 1532 controls the terminal not to perform communication through the determined subframe.

Exemplary embodiments of the present invention may support the HARQ scheme without resource collision by temporarily applying the asynchronous HARQ scheme in order to avoid the resource collision which occurs in the case where the synchronous HARQ scheme is used in a broadband wireless communication system. Therefore, since a resource inside a subframe where collision is expected to occur may be used, a resource use efficiency increases.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for operating a base station in a wireless communication system, the method comprising:
    determining whether a resource used for a system of a different standard and a resource used for one of a Hybrid Automatic Repeat reQuest (HARQ) reply and an HARQ retransmission packet by a synchronous HARQ scheme collide with each other;
    allocating a collision packet IDentifier (ID) to an HARQ subburst corresponding to one of the HARQ reply and the HARQ retransmission packet estimated to collide, and changing an offset of the one of the HARQ reply and the HARQ retransmission;
    generating a MAP message comprising at least one of the collision packet ID and changed offset information; and
    transmitting the MAP message.

2. The method of claim 1, wherein the determining of whether the resource used for the system of the different standard and the resource used for the one of the HARQ reply and the HARQ retransmission packet collide with each other comprises:
    determining whether some of subframes of a next frame are used for the system of the different standard with reference to a mode transition indicator which informs that resource allocation for the system of the different standard starts; and
    determining whether a subframe used for the system of the different standard is the same as a subframe through which the one of the HARQ reply and the HARQ retransmission packet is to be transmitted with reference to ratio information of a resource used for the system of the different standard.

3. The method of claim 1, wherein the MAP message comprises at least one of 'CPID' representing the collision packet ID, 'ACK CH subframe Offset' representing a changed offset of the HARQ reply, and 'OFDMA symbol offset' and 'subchannel offset' representing a changed offset of the HARQ retransmission.

4. The method of claim 3, wherein the MAP message comprises an uplink MAP message for uplink HARQ packet.

5. The method of claim 1, further comprising:
    allocating a resource for an HARQ initial transmission packet for the HARQ subburst according to a synchronous HARQ scheme, before the determining of whether the resource used for the system of the different standard and the resource used for the one of the HARQ reply and the HARQ retransmission packet collide with each other; and
    transmitting a MAP message including resource allocation information according to the synchronous HARQ scheme.

6. The method of claim 1, wherein the MAP message is transmitted in a frame in which is a service of the system of the different standard is provided or a previous frame of the frame in which the service of the system of the different standard is provided.

7. The method of claim 6, further comprising:
    during allocation of a resource of a subframe in the frame in which is the service of the system of the different standard is provided, when there exists one of an HARQ reply and an HARQ retransmission packet having a non-zero offset indicating the subframe, allocating a resource to the one of the HARQ reply and the HARQ retransmission packet.

8. The method of claim 1, further comprising:
    allocating the resource for the system of the different standard in a frame in which is a service of the system of the different standard is provided.

9. The method of claim 8, wherein the allocating of the resource for the system of the different standard comprises:
    allocating the resource for the system of the different standard according to a time division scheme in a downlink section; and
    allocating the resource for the system of the different standard according to a frequency division scheme in an uplink section.

10. The method of claim 1, further comprising:
    broadcasting information informing of a resource allocation for supporting the system of the different standard starts, and information informing of an amount of a resource for the system of the different standard in a previous frame of a frame in which a service of the system of the different standard is provided.

11. The method of claim 1, the system of the different standard comprises an Institute of Electrical and Electronics Engineers (IEEE) 802.16e system.

12. A method for operating a terminal in a wireless communication system, the method comprising:
receiving a MAP message comprising at least one of a changed offset of one of a Hybrid Automatic Repeat reQuest (HARQ) reply and an HARQ retransmission and collision packet Identifier (ID) for an HARQ subburst;
updating an offset of one of the HARQ reply and the HARQ retransmission for the HARQ subburst according to the changed offset; and
receiving one of an HARQ reply and an HARQ retransmission packet via a resource indicated by the updated offset of one of the HARQ reply and the HARQ retransmission.

13. The method of claim 12, wherein the MAP message comprises at least one of 'CPID' representing the collision packet ID, 'ACK CH subframe Offset' representing a changed offset of the HARQ reply, and 'OFDMA symbol offset' and 'subchannel offset' representing a changed offset of the HARQ retransmission.

14. The method of claim 13, wherein the MAP message comprises an uplink MAP message for uplink HARQ packet.

15. The method of claim 12, further comprising:
receiving a MAP message including resource allocation information according to the synchronous HARQ scheme before receiving the MAP message comprising at least one of the changed offset of one of the HARQ reply and the HARQ retransmission and collision packet ID for the HARQ subburst.

16. The method of claim 12, wherein the MAP message is received in a frame in which is a service of a system of a different standard is provided or a previous frame of the frame in which the service of the system of the different standard is provided.

17. The method of claim 12, further comprising:
receiving information informing of a resource allocation for supporting the system of the different standard starts, and information informing of an amount of a resource for the system of the different standard in the previous frame of the frame in which the service of the system of the different standard is provided.

18. The method of claim 17, the system of the different standard comprises an Institute of Electrical and Electronics Engineers (IEEE) 802.16e system.

19. A method for operating a base station in a wireless communication system, the method comprising:
determining whether a resource used for a system of a different standard and one of a Hybrid Automatic Repeat reQuest (HARQ) reply and an HARQ retransmission packet by a synchronous HARQ scheme collide with each other; and
delaying resource allocation for the system of the different standard until an HARQ process corresponding to the one of the HARQ reply and the HARQ retransmission packet is completed when the collision is estimated.

20. The method of claim 19, wherein the estimating of the resource and the one of the HARQ reply and the HARQ retransmission packet collide with each other comprises:
determining whether some of subframes of a next frame are used for the system of the different standard with reference to a mode transition indicator; and
determining whether a subframe used for the system of the different standard is the same as a subframe through which the one of the HARQ reply and the HARQ retransmission packet is to be transmitted with reference to ratio information of a resource used for the system of the different standard.

21. The method of claim 19, wherein the delaying of the resource allocation for the system of the different standard comprises:
suspending resource allocation to the rest except the one of the HARQ reply and the HARQ retransmission packet among data to be transmitted through a subframe estimated to collide.

22. An apparatus for a base station of a wireless communication system, the apparatus comprising:
a scheduler for determining whether a resource used for a system of a different standard, and a resource used for one of a Hybrid Automatic Repeat reQuest (HARQ) reply and an HARQ retransmission by a synchronous HARQ scheme collide with each other, for allocating a collision packet Identifier (ID) to an HARQ subburst corresponding to one of an HARQ reply and an HARQ retransmission packet estimated to collide, and for changing an offset of the one of the HARQ reply and the HARQ retransmission;
a generator for generating a MAP message comprising at least one of the collision packet ID and changed offset information; and
a transmitter for transmitting the MAP message.

23. The apparatus of claim 22, wherein the scheduler determines whether some of subframes of a next frame are used for the system of the different standard with reference to a mode transition indicator which informs that resource allocation for the system of the different standard starts, and determines whether a subframe used for the system of the different standard is located in the same position as that of a subframe through which the one of the HARQ reply and the HARQ retransmission packet is to be transmitted with reference to ratio information of a resource used for the system of the different standard.

24. The apparatus of claim 22, wherein the MAP message comprises at least one of 'CPID' representing the collision packet ID, 'ACK CH subframe Offset' representing a changed offset of the HARQ reply, and 'OFDMA symbol offset' and 'subchannel offset' representing a changed offset of the HARQ retransmission.

25. The apparatus of claim 24, wherein the MAP message comprises an uplink MAP message for uplink HARQ packet.

26. The apparatus of claim 22, wherein the scheduler allocates a resource for an HARQ initial transmission packet for the HARQ subburst according to a synchronous HARQ scheme, before the determining of whether the resource used for the system of the different standard and the resource used for the one of the HARQ reply and the HARQ retransmission packet collide with each other, and
the transmitter transmits a MAP message including resource allocation information according to the synchronous HARQ scheme.

27. The apparatus of claim 22, wherein the MAP message is transmitted in a frame in which is a service of the system of the different standard is provided or a previous frame of the frame in which the service of the system of the different standard is provided.

28. The apparatus of claim 22, wherein, during allocation of a resource of a subframe in a frame in which the service of the system of the different standard is provided, when there exists one of an HARQ reply and an HARQ retransmission packet having a non-zero offset indicating the subframe, the scheduler allocates a resource to the one of the HARQ reply and the HARQ retransmission packet.

29. The apparatus of claim 22, wherein the scheduler allocates the resource for the system of the different standard in a frame in which is a service of the system of the different standard is provided.

30. The apparatus of claim 29, wherein the scheduler allocates the resource for the system of the different standard according to a time division scheme in a downlink section, and allocates the resource for the system of the different standard according to a frequency division scheme in an uplink section.

31. The apparatus of claim 22, wherein the transmitter for broadcasting information informing of a resource allocation for supporting the system of the different standard starts, and information informing of an amount of a resource for the system of the different standard in a previous frame of a frame in which is a service of the system of the different standard is provided.

32. The apparatus of claim 22, the system of the different standard comprises an Institute of Electrical and Electronics Engineers (IEEE) 802.16e system.

33. An apparatus for a terminal of a wireless communication system, the apparatus comprising:
 a receiver for receiving a MAP message comprising at least one of a changed offset of one of a Hybrid Automatic Repeat reQuest (HARQ) reply and an HARQ retransmission and collision packet Identifier (ID) for an HARQ subburst; and
 a controller for updating an offset of one of the HARQ reply and the HARQ retransmission for the HARQ subburst according to the changed offset, and for controlling to receive one of an HARQ reply and an HARQ retransmission packet via a resource indicated by the updated offset of one of the HARQ reply and the HARQ retransmission.

34. The apparatus of claim 33, wherein the MAP message comprises at least one of 'CPID' representing the collision packet ID, 'ACK CH subframe Offset' representing a changed offset of the HARQ reply, and 'OFDMA symbol offset' and 'subchannel offset' representing a changed offset of the HARQ retransmission.

35. The apparatus of claim 34, wherein the MAP message comprises an uplink MAP message for uplink HARQ packet.

36. The apparatus of claim 33, wherein the receiver receives a MAP message including resource allocation information according to the synchronous HARQ scheme before receiving the MAP message comprising at least one of the changed offset of one of the HARQ reply and the HARQ retransmission and collision packet ID for the HARQ subburst.

37. The apparatus of claim 33, wherein the MAP message is received in a frame in which is a service of a system of a different standard is provided or a previous frame of the frame in which the service of the system of the different standard is provided.

38. The apparatus of claim 33, wherein the receiver receives information informing of a resource allocation for supporting the system of the different standard starts, and information informing of an amount of a resource for the system of the different standard in the previous frame of the frame in which the service of the system of the different standard is provided.

39. The apparatus of claim 38, the system of the different standard comprises an Institute of Electrical and Electronics Engineers (IEEE) 802.16e system.

40. An apparatus for a base station of a wireless communication system, the apparatus comprising:
 a scheduler for determining whether a resource used for a system of a different standard, and one of an HARQ reply and an HARQ retransmission packet by a synchronous HARQ scheme collide with each other, and when the collision is estimated, for delaying resource allocation for the system of the different standard until an HARQ process corresponding to the one of the HARQ reply and the HARQ retransmission packet is completed.

41. The apparatus of claim 40, wherein the scheduler determines whether some of subframes of a next frame are used for the system of the different standard with reference to a mode transition indicator, and determines whether a subframe used for the system of the different standard is the same as a subframe through which the one of the HARQ reply and the HARQ retransmission packet is to be transmitted with reference to ratio information of a resource used for the system of the different standard.

42. The apparatus of claim 40, wherein the scheduler suspends resource allocation to the rest except the one of the HARQ reply and the HARQ retransmission packet among data to be transmitted through a subframe estimated to collide.

* * * * *